United States Patent
Ohyama et al.

(10) Patent No.: US 7,586,629 B2
(45) Date of Patent: Sep. 8, 2009

(54) PRINTING SYSTEM FOR ALLOCATING A PLURALITY OF IMAGE PROCESSING ITEMS BETWEEN AN IMAGE INPUT DEVICE AND AN IMAGE OUTPUT DEVICE

(75) Inventors: Masakazu Ohyama, Nara (JP); Katsumi Amakawa, Yamatotakada (JP); Takahiro Daido, Hirakata (JP); Yohsuke Konishi, Nara (JP); Hitoshi Hirohata, Kashihara (JP); Hiroshi Kawamura, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 897 days.

(21) Appl. No.: 10/342,018

(22) Filed: Jan. 13, 2003

(65) Prior Publication Data

US 2003/0133154 A1 Jul. 17, 2003

(30) Foreign Application Priority Data

Jan. 15, 2002 (JP) ............................. 2002-006487

(51) Int. Cl.
*G06F 15/00* (2006.01)
*G06F 3/12* (2006.01)
*G06K 1/00* (2006.01)

(52) U.S. Cl. ..................................... 358/1.13; 358/1.15
(58) Field of Classification Search ......... 358/1.1–1.18, 358/3.27, 3.28; 709/230, 217, 225
See application file for complete search history.

(56) References Cited

U.S. PATENT DOCUMENTS

| 6,947,994 | B1* | 9/2005 | Kraslavsky | 709/230 |
| 7,167,258 | B2* | 1/2007 | Yamamoto | 358/1.15 |
| 7,218,404 | B2* | 5/2007 | Tsuchitoi | 358/1.13 |

FOREIGN PATENT DOCUMENTS

| JP | 05-100804 | 4/1993 |
| JP | 06-199000 | 7/1994 |
| JP | 07-306760 | 11/1995 |
| JP | 08-186724 | 7/1996 |
| JP | 10-084442 | 3/1998 |
| JP | 10-271252 | 10/1998 |
| WO | WO-99/55534 | 11/1999 |

* cited by examiner

*Primary Examiner*—Douglas Q Tran
(74) *Attorney, Agent, or Firm*—Edwards Angell Palmer & Dodge LLP; David G. Conlin; David A. Tucker

(57) ABSTRACT

The present printing system comprises a host computer (1) that orders scanners (2), digital cameras (3) and printers (4) to execute image processing, the host computer (1) setting up items of image processing to be performed by the printer (4) depending on the model of scanner (2) or digital camera (3) being used. The host computer (1) can set up the most suitable image processing items according to what kind of scanner (2) or digital camera (3) is used. Of the scanner (2), digital camera (3) and printer (4), the device having better processing ability can be assigned to more processes so that the time required for printing is shortened efficiently.

5 Claims, 13 Drawing Sheets

PRINTING SYSTEM FOR ALLOCATING A PLURALITY OF IMAGE PROCESSING ITEMS BETWEEN AN IMAGE INPUT DEVICE AND AN IMAGE OUTPUT DEVICE

FIELD OF THE INVENTION

The present invention relates to a printing system, a printing method, a program and a recording medium for printing out an image data input through an image input device by an image output device.

DESCRIPTION OF THE RELATED ART

Heretofore, a printing system has been developed for printing out an image data generated by (read through) an image input device such as a scanner through an image output device.

Moreover, it has become possible to print out the image photographed using an image input device such as a digital camera by an image output device such as a printer.

Japanese Patent Laid-Open Publication No. 7-306760 discloses an electric device and the method of manufacturing the same enabling high speed print out of data through a printer by switching appropriately the format of the data transferred to the printer according to the processing ability of the printer and the data to be printed.

According to the method disclosed in the above-mentioned Japanese Patent Laid-Open Publication No. 7-306760, the printing data is expanded into bitmapped data by the electric device, and the speed for compressing the expanded data before transferring the same to the printer and printing the same is compared with the speed for transferring the printing data as non-compressed bitmapped data to the printer and printing the same, and the faster method is selected.

Moreover, when the bitmapped data is compressed, the time required for the printer to decompress the data is considered as well.

Japanese Patent Laid-Open Publication No. 6-199000 discloses a printing system wherein the printing resource name and the quantity of printing resource data of the corresponding plural printing devices are stored in printing device resource control tables, and a CPU of a host computer examines which printing resource among the printing resources specified by a print defining body is not stored in the printing devices when the object printing data readout from a spool data storing section is sent out to the printing devices, based on which the system determines the printing device whose number of printing resources to be transferred or data quantity of the printing resources is minimum, and transfers the data to be printed to the selected printing device.

According to the printing system disclosed in above Japanese Patent Laid-Open Publication No. 6-199000, it is possible to select the printing device to be used for printing by determining the storage status of printing resources in each of the plurality of printing devices connected to the system, and to improve the transfer efficiency of the printing resource, so as to cut down the printing time.

Further, Japanese Patent Laid-Open Publication No. 5-100804 discloses a printing system in which each printer connected to a network acquires an emulation program (for example by downloading the program from a server) for converting and printing the text data transferred thereto from a personal computer, and the printer processes the text data so that it corresponds to the printing control performed at the printer so as to execute printing.

When an image data generated by a scanner or digital camera is printed directly without processing the image data, the quality of the printed image is degraded.

Thus, in an ordinary printing system, image data processing including plural items of processing such as A/D conversion and shading compensation are performed to the generated image data.

In general, the image data being transferred from a scanner or a digital camera to the printer has already received some of the above-mentioned treatments.

Then, the printer is set to perform the remaining processes to the image data being transferred thereto.

However, according to the prior art printing system explained above, the scanners, digital cameras and printers are designed to perform only the predetermined items of processing.

Therefore, it is not possible for the printer to flexibly switch the processes to be performed according to what type of image input device is used (for example, the model of the scanner or digital camera being used), or according to what processes the image input device has performed (items of image processing that the image input device is capable of performing).

Moreover, the prior art system disclosed in Japanese Patent Laid-Open Publication No. 7-306760 compares the speed required for printing in different processing methods and selects the faster method, and the prior art system disclosed in Japanese Patent Laid-Open Publication No. 6-199000 selects the printing device according to which the number of printing resources to be transferred or the quantity of data of the printing resource is minimum, so that the transfer efficiency is improved and the printing time shortened. The former system considers the processing abilities and compares them, but these prior art systems merely execute the items of image processing that are set up in advance, and do not have the flexibility to assign processes according to the processing abilities of the devices being used. Therefore, is the processing ability of one device is significantly inferior to the ability of the other device involved in printing, the time required for the whole printing process is increased.

Moreover, the printing system disclosed in Japanese Patent Laid-Open Publication No. 5-100804 selects an emulation program according to the received print data, but there is no consideration on the flexibility of the processes, and the disclosed system does not allow the processes to be switched according to conditions.

SUMMARY OF THE INVENTION

The printing system of the present invention not only enables to select the most suitable program according to the input image data, but also assigns the share of image processing to be performed by the image input device and the image output device according to their abilities.

Thus, according to the present system, the performance of the printing process is improved compared to the system allowing to select only the program to be used.

Moreover, compared to the case where only a single program is selected, according to the present invention it is possible to switch programs partially so as to realize processes that correspond better to the image data being input.

The present invention aims at solving the problems of the prior art.

The object of the present invention is to provide a printing system capable of completing the image processing in a relatively short time even when there is much difference between the processing ability of the image input device and the processing ability of the image output device.

Another object of the present invention is to provide a printing system, a printing method, a program and a recording medium capable of setting up the items of image processing to be performed by the image output device in response to the processes performed by the image input device determined by the type of image input device being used or the information included in the image data generated by the image input device, or those capable of setting up the share of items of image processing to be assigned to the image input device and the image output device, respectively.

The printing system according to the present invention for providing to an image data generated by an image input device a predetermined image processing for printing, and printing out the image data to which the image processing is performed through an image output device, comprises a control unit for ordering said image input device and said image output device to perform said image processing, the control unit being capable of determining the share of items of image processing to be assigned to the image input device and the image output device, respectively, according to the processing abilities of the image input device and the image output device.

The present printing system comprises an image input device for scanning a document and generating an image data, and an image output device for printing out the image data having been subjected to image processing, the image input device and the image output device designed to read in the image, execute image processing to the generated image data, and print out the image.

The term "image processing" refers to the treatment that must be performed to the image (image data) for printing.

The image input device generates an analog image data by scanning a document, but it is difficult to directly print out such image data through the image output device.

Therefore, according to the present printing system, generally when an image data is read in, image processing including various items of processes such as A/D conversion and shading compensation are performed to the image data.

Moreover, the present printing system is equipped with a control unit for controlling especially the image input device and image output device.

The control unit determines the share of items of image processing to be performed by (assigned to) the image input device and the image output device, respectively, depending on the data processing abilities of the image input device and image output device.

In other words, according to the present printing system, the device having a more advanced processing ability between the image input device and the image output device is assigned to more items of processes, and the one having the lower processing ability is assigned to less items.

For example, if the processing ability of the image output device is more advanced than the processing ability of the image input device, the image output device performs instead of the image input device the region isolation process, which is one of the items that the image input device normally performs, thereby reducing the processing load of the image input device.

The present invention shortens the time required for image processing, and as a result, cuts down the time required for printing the image.

According to the present printing system, the items of image processing include shading compensation, gamma correction, region isolation, black generation, filter/zoom processing, and halftone processing to be performed to the image data generated by the image input device.

According to this image processing, the image data generated by the image input device is converted into data that can be handled easily by the image output data.

According further to the present printing system, the control unit stores in its memory the processing abilities of the image input device and the image output device during an initial state in which the image input device and the image output device are constructed as the present printing system.

In other words, the processing abilities (actually, the data processing speed for processing the image data) of the image input device and image output device are stored in the control unit at the time the present printing system including the image input device and image output device is initially constructed, so the items of image processing to be performed to the image data can be assigned without delay.

According further to the present printing system, when transferring the image data to the image output device, the image input device adds information on the items performed thereby to the transfer data.

Thereby, the image output device can easily recognize the items of processing that have been completed and the items of processing to be performed thereby (the items of processing yet to be performed).

In the present printing system, the image input device adds the items of processing performed thereby to the header portion of a transfer data.

Thus, the image output device is capable of recognizing without delay what items of processing it must perform based on the information added to the header upon receiving the transfer data, and is capable of starting the image processing quickly.

Moreover, according to the present printing system, when the image input device and the image output device are not equipped with the functions to perform the items of processing assigned thereto, they can acquire these functions through use of the control unit.

That is, according to the present printing system, the image input device and/or the image output device may not be equipped with the function (software) to execute the items of processing assigned thereto by the control unit.

Therefore, the image input device and image output device are set to acquire the required functions through use of the control unit.

The actual methods for acquiring the functions include a method of using the software installed to the control unit, or a method of downloading the software from the control unit.

Thus, the present printing system can be realized easily.

According further to the present printing system for printing out through an image output device an image data generated by an image input device after predetermined image processing is performed to the image data for printing; the system comprises a control unit for ordering the image input device and the image output device to perform the image processing, the control unit setting up the items of image processing to be performed by the image output device depending on the type of image input device being used.

The present printing system is equipped with a control unit for controlling the image input device and the image output device (printers and complex machines).

The control unit determines the items of image processing to be performed by the image output device according to the type of image input device being used.

For example, depending on whether the image input device is a digital camera or a scanner, the items of processing executed by the image output device is changed.

For example, if the image input device is a digital camera, unlike the scanner, the input device can perform brightness adjustment, contrast adjustment, color saturation adjustment etc. to the image data being taken in, so the information on these adjustments being performed are sent together with the image data to the image output device, so that processes yet to be performed are executed by the image output device.

Moreover, depending on the model of the digital camera being used, the input device (digital camera) may also perform the color correction process, so only the processes to be performed thereafter, which are the filter/zoom processing and halftone processing, are set to be performed by the image output device.

The setting is performed for example by changing the parameters used for image processing or by downloading the program for performing the image processing.

Thereby, the most appropriate items of image processing can be set up according to the image input device being used, and thus the quality of the output image is improved.

Further, of the image input device and image output device being used, the device having the more advanced processing ability is assigned to more items of processing.

For example, if the processing ability of the image output device is advanced than the input device, the image output device performs region isolation performed normally by the input device instead of the input device.

Thus, according to the printing system of the present invention, more items of image processing can be assigned to the device having the more advanced processing ability, and less items can be assigned to the device having lower processing ability, so as to reduce the time required for printing.

The present printing system for printing out through an image output device an image data generated by an image input device and subjected to predetermined image processing for printing; the system comprises a control unit for ordering the image input device and the image output device to perform the image processing, the control unit setting up the items of image processing to be performed by the image output device according to the information included in the image data generated by the image input device.

The printing system is equipped with a control unit for controlling the image input device and the image output device.

The control unit is designed to set up the items of image processing to be performed by the image output device according to the information included in the image data that the image input device generates.

For example, the control unit sets up the items of image processing to be performed by the image output device so that the document image is recreated faithfully according to the classification of the document (text document, photograph document, or text/photograph document) being read in by the scanner when generating the image data.

In other words, regarding the process to be performed at the image output device, the control unit determines parameters for black generation and filter processing so that the texts are defined more clearly if the document is a text document, and determines parameters so that color correction is performed with weight on color saturation if the text document includes color texts.

Further, if the document is a photograph document, color correction prioritizing on tone characteristics and halftone processing are selected.

Thus, the control unit can set up the most appropriate items of image processing to be performed according to document classification, resulting in the improved quality of the output image.

According to the present printing system, the control unit is equipped to the image output device.

According to this system, the control unit is equipped to the image output device so that there is no need to provide a separate control unit from the image input device and image output device.

In other words, there is no need to connect the image input device and the image output device via a control unit (personal computer), but the image data read in by the image input device can be subjected to appropriate image processing and output directly through the image output device.

According further to the present printing system, the image input device adds to the image data being transmitted (transfer data) information regarding the items of image processing that have been performed and the type of image input device being used (device data) when transferring the image data to the image output device.

By this system, the image output device is enabled to recognize the items of image processing that it must perform based on the transferred data.

According further to the present printing system, when the image input device and the image output device are not equipped with the functions (programs) to perform the image processing, the devices are set to acquire (download) the functions through the control unit.

In the present printing system, the image input device and the image output device may not be equipped with the function (program) to perform the process items being assigned thereto by the control unit.

Therefore, according to this feature of the invention, the image input device and image output device are designed to acquire the necessary functions using the control unit (either by using the program stored in the control unit or by downloading the program through the internet by the control unit).

Therefore, it is not necessary to install programs in advance to the image input devices such as scanners.

According to the present printing method for printing out through an image output device an image data generated by an image input device and subjected to predetermined image processing for printing; the method includes the step of ordering the image input device and the image output device to execute the image processing, and setting up the share of items of image processing to be assigned to the devices.

According to the present printing method for printing out through an image output device an image data generated by an image input device and subjected to predetermined image processing for printing; the method includes the step of setting up the items of image processing to be performed by the image output device according to the type of image input device being used by a control unit that orders the image input device and the image output device to execute the image processing.

According further to the present printing method for printing out through an image output device an image data generated by an image input device and subjected to predetermined image processing for printing; the method includes the step of setting up the items of image processing to be performed by the image output device according to the information included in the image data generated by the image input device by a control unit that orders the image input device and the image output device to execute the image processing.

The program according to the present invention characterizes in enabling a computer to execute the printing methods mentioned above.

By use of the above program, the control unit is capable of recognizing the processing abilities of the image input device (scanner) and image output device, the type of image input device being used, and the information included in the input image data, and based on the recognized result, the control unit can set up the items of processing to be performed by the image output device or to assign the share of items to be performed by the image input device and the image output device.

The recording medium according to the present invention characterizes in storing the above-mentioned program.

By storing the above-mentioned program in a recording medium, the control unit is capable of reading the printing method stored in that recording medium.

Thus, the control unit can perform the desired printing method easily.

DETAILED DESCRIPTION OF THE PREFERRED EMBODIMENT

The preferred embodiments of the present invention will now be explained in detail with reference to the accompanying drawings.

Embodiment 1

Figure 1:
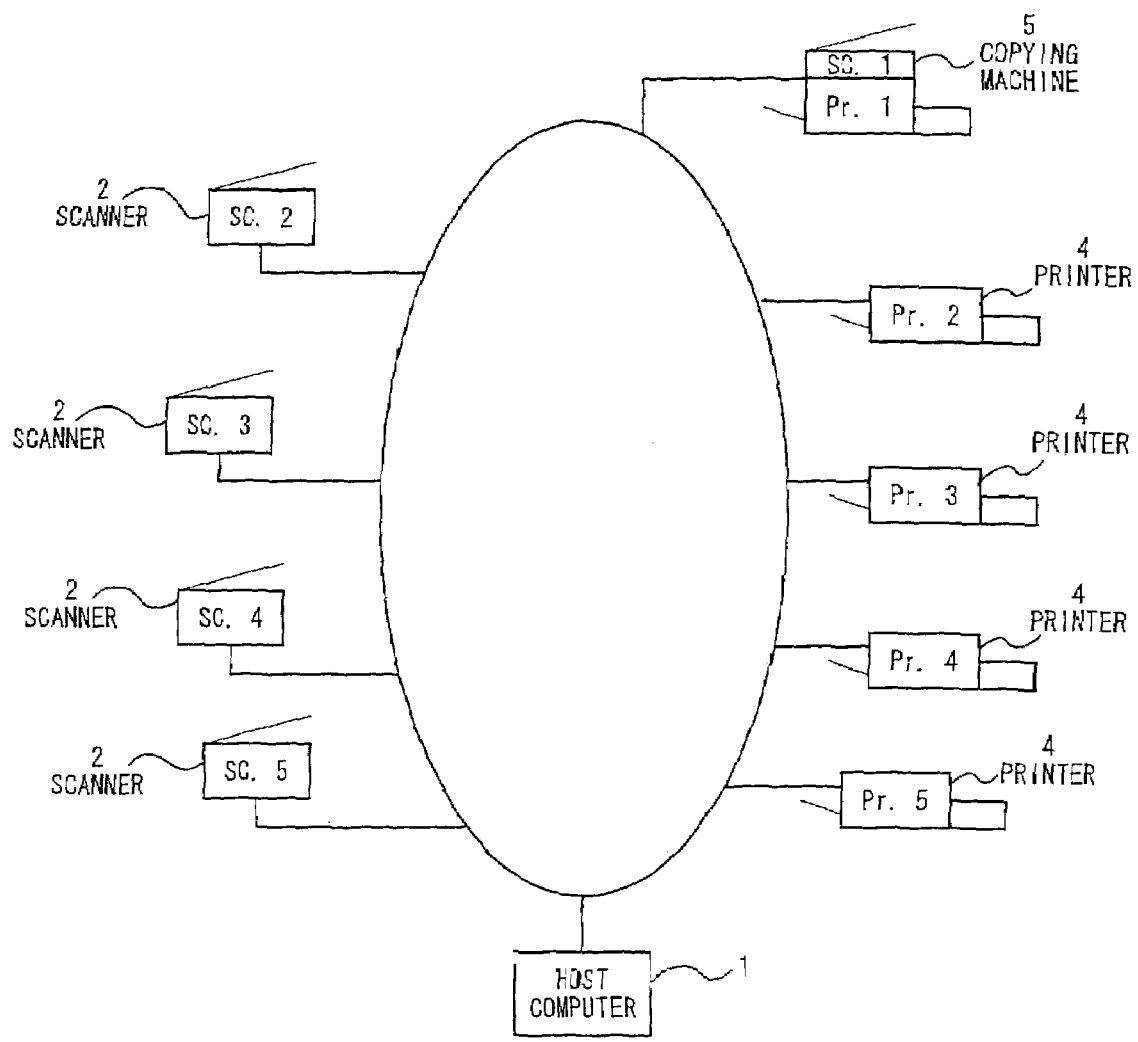
FIG. 1 is an explanatory view showing the configuration of the printing system according to embodiment 1 of the present invention.

FIG. 1 is an explanatory view showing the configuration of the printing system according to embodiment 1 of the present invention.

As shown in FIG. 1, the printing system of the present invention comprises a host computer 1 functioning as a control unit, a plurality of scanners 2 (SC2, SC3, SC4, SC5 . . . ) functioning as image input devices, a plurality of printers 4 (Pr2, Pr3, Pr4, Pr5 . . . ) functioning as image output devices, and a copying machine 5 functioning as image forming device (equipped with a scanner SC1 and a printer Pr1), all of which are connected via a network.

The host computer 1 constitutes a control unit being the nerve center of the present printing system, capable of controlling the scanner 2, the printer 4 and the copying machine 5 for printing.

The scanner 2 functioning as the image input device is equipped with a document platform, an optical scanning unit, a CCD (charge coupled device) and so on, capable of generating image data by reading in the original document image.

The, printer 4 functioning as the image output device prints an image on a sheet of paper based on the image data generated by the scanner 2.

The copying machine 5 functioning as the image forming device is a combo-type copier having the functions of both the scanner 2 and the printer 4.

The image data used for printing by the printer 4 is, as explained later, obtained by providing a predetermined image processing to the image data generated by the scanner 2.

This image processing is necessary for truly reproducing the original image through printer 4, and it includes plural items of processing related to the image such as A/D conversion and various corrections (as will be described in detail hereinafter).

The host computer 1 functioning as the control unit recognizes and stores in a hard disc not shown the processing abilities (data processing ability or data processing speed) of all the image input devices (scanners 2), the image output devices (printers 4) and image forming devices (copying machines 5).

The timing for recognizing the data processing ability of the various image input devices (scanners 2), image output devices (printers 4) and image forming devices (copying machines 5) are when each device (scanners 2, printers 4 and copying machines 5) is connected to the printing system of the present invention, or in other words, at the initial state.

The host computer 1 shares and assigns the plural image processing items to be performed by the scanner 2 and the printer 4 according to the processing abilities of the scanner 2 and printer 4, and if necessary according to the status, changes the share of the image processing items to be performed respectively at the scanner 2 and the printer 4.

Now, we will explain the items of image processing to be executed by the scanner 2 and the printer 4.

Figure 2:
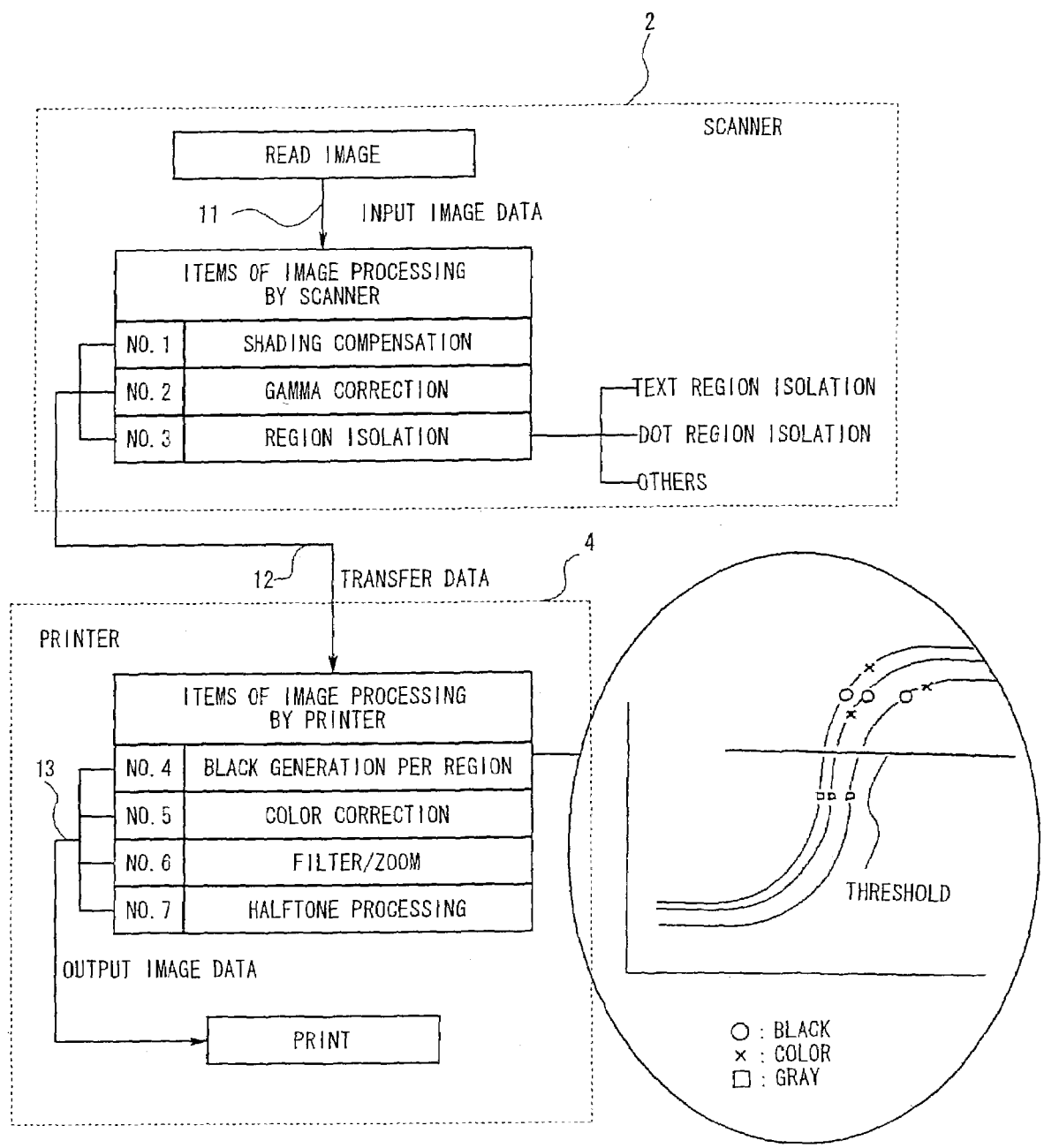
FIG. 2 is an explanatory view showing the contents of processes to be executed as image processing in the printing system of embodiment 1.

FIG. 2 is an explanatory view showing the contents of the items of processing to be executed in the image processing of the printing system of embodiment 1.

As shown in FIG. 2, the scanner 2 reads in the original image by optically scanning the document image, and the RGB signal of the reflected image of that document image is processed by A/D conversion to generate an input image data 11, which then receives image processing.

The items of image processing in this example are shading compensation, gamma correction and region isolation.

Shading compensation is a process of eliminating various distortions caused by the lighting system, the imaging system and the image pickup system of the scanner 2.

Gamma correction is a process of correcting the signal strength of the input image data 11 so as to achieve the required density for each tone.

Gamma correction is performed to prevent the inaccurate tone variation that will be caused when the signal strength of the input image data 11 is used as it is without correction.

Region isolation is a process of separating the total region of the image data into various regions such as text region, dot region, photograph region and so on.

When the image processing at scanner 2 is completed, the image data is transmitted as transfer data 12 to a printer 4, where further image processing is performed.

As shown in FIG. 2, processes such as black generation, color correction, filter/zoom and halftone processing are performed at printer 4.

Black generation is a process of generating K (black) signal from an image data having three colors (for example, C (cyan), M (magenta) and Y (yellow)).

In the black generation process, the means for generating black is switched according to the result of region isolation.

According to a common black generation, the black generation gamma curve as shown in the following formula is utilized. In the formula, K represents the black generation quantity, and C, M and Y represent the density in the image data.

$$K=\text{Gamma}(\min(C, M, Y))$$

Color compensation is a process of removing and eliminating the color turbidity based on spectral characteristics of the C, M, Y color material components including unnecessary absorption components, thereby improving the reproductivity of the output image.

Filter processing is a process of correcting the spatial frequency characteristics by a spatial filtering process, thereby suppressing the generation of graininess degradation, blur, moiré etc. appearing in the output image.

Halftone processing is a process of providing either a binarization or a multivalue processing to the image data using a predetermined screen.

Through the above-mentioned image processing, printer 4 generates an output image data 13 based on the transferred data 12, and prints the image using the output image data 13.

Next, the printing process according to the printing system of the present invention will be explained.

In the present printing system, a user uses one scanner 2 to have the original document image read in, and then the user selects which printer 4 to be utilized.

The host computer 1 controls the scanner 2 and transmits the image data to the selected printer 4.

Especially, according to the present printing system, the host computer 1 recognizes the image processing ability (data processing ability) of the specific scanner 2 and the printer 4 used for the printing, and based on the recognized processing ability, assigns the share of items of image processing to be executed by the scanner 2 and the printer 4, respectively.

For example, if the processing ability of the printer 4 is more advanced than that of the scanner 2, the host computer 1 assigns to the printer 4 a portion of the processes that the scanner 2 is generally assigned to perform (such as region isolation), so as to reduce the load of the processes to be performed by scanner 2 and to increase the processes performed by printer 4.

Figure 3:
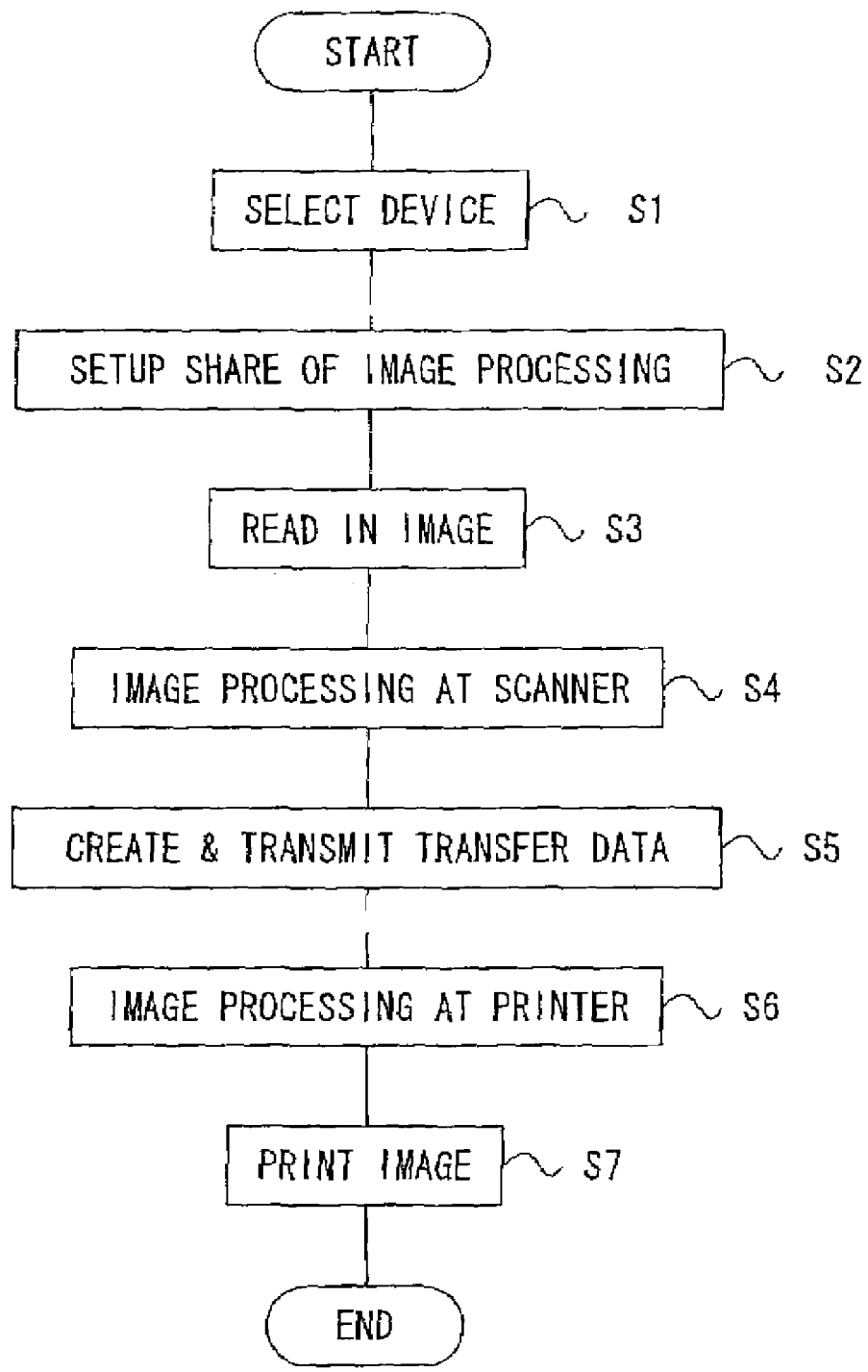
FIG. 3 is a flowchart showing the flow of the printing process according to the printing system of embodiment 1.

FIG. 3 is a flowchart illustrating the flow of the printing process by the printing system according to embodiment 1 of the present invention.

As shown in FIG. 3, according to the present printing system, at first the user selects the devices, in other words, selects the scanner 2 and printer 4 to be used (step S1), and accordingly, the host computer 1 sets up the share of the processes of image processing to be executed by the selected scanner 2 and selected printer 4, respectively (step S2).

The scanner 2 reads in the analog image data, and performs the processes assigned thereto by the host computer 1 (steps S3 and S4).

The scanner 2 creates a transfer data 12 as shown in FIG. 2, and transmits the data to the printer 4 (step 5S).

The transfer data 12 is composed of the image data processed by scanner 2, and data representing the processes executed by scanner 2 (processed items data).

The printer 4 refers to the processed items data in the transferred data 12 that it receives, and confirms the processes that the printer must execute (yet-to-be-executed processes).

The printer 4 performs the yet-to-be-executed processes to the image data included in the transferred data 12, and generates an output image data 13 as is shown in FIG. 2, before printing the image data (steps S6, S7).

As explained, according to the present printing system comprising a host computer 1 capable of ordering image processing to be executed by the scanner 2 and the printer 4, respectively, the host computer 1 can determine the share of image processing items to be executed respectively by the scanner 2 and the printer 4 according to the processing abilities thereof.

In other words, according to the present printing system, the device having the better processing ability of the selected scanner 2 and printer 4 is assigned with more processing items, while the processing items to be executed by the device having lower processing ability are reduced.

The present printing system thus reduces the time required for image processing, and as a result, reduces the time required for printing.

The host computer 1 stores in its memory the processing abilities of the scanners 2 and printers 4 at the initial state, for example when establishing the printing system.

Since the host computer 1 stores in advance in its memory the processing abilities of the scanners 2 and printers 4 at the initial state of establishing the printing system, the assignment of processes to be performed by the scanner 2 and the printer 4 can be determined quickly.

Moreover, the scanner 2 adds the processed items data to the transfer data 12 when transferring the image data to the printer 4.

Thereby, the printer 4 can recognize easily what image processes it must execute (yet-to-be-executed processes).

It is preferable that the scanner 2 adds the processed items data to the header portion of the transfer data 12.

The header portion is the first part printer 4 reads, so thereby, the printer 4 can recognize at an early stage what the processes to be executed are, and so it can start image processing without delay.

The scanner 2 and the printer 4 may not be equipped with the ability (software) to execute the processes that are assigned to them by the host computer 1.

In that case, according to the present printing system, the scanner 2 and the printer 4 acquire via host computer 1 the software required to execute the processes assigned thereto.

In other words, when the scanner 2 or the printer 4 does not have the required software, the software stored in the memory of host computer 1 is used.

In another possible example, the software can be downloaded from the host computer 1 to the scanner 2 or printer 4.

In order to acquire the software using host computer 1, it is preferable that the host computer stores in its memory the software for executing all the processes required in image processing.

Moreover, it is preferable to install to scanners 2 and printers 4 a program enabling download of software.

According to embodiment 1, the host computer 1 determines which items of image processing are to be executed by the scanner 2 and the printer 4, respectively.

However, the present invention is not limited to such example. It is possible to set either the scanner 2 or the printer 4 selected instep S1 of FIG. 3 to determine the share of processes according to the processing ability of itself and of the other selected device.

Further, when image processing usually executed by scanner 2 is set to be performed by printer 4, it is preferable that the scanner 2 includes the numeric values inherent thereto (attributes such as shading compensation data, gamma correction value etc.) in the transfer data, and the printer 4 is preferably set up so as to execute image processing for the remaining items utilizing these numeric values.

Thereby, image processing inherent to scanners 2 can be easily executed by the selected printer 4.

The share of image processing can be determined not only uniformly according to the processing abilities of the scanner 2 and printer 4, but also according to the usage of the printer 4.

For example, when the selected printer 4 is already used by another user, the host computer 1 preferably considers the status of the printer 4 in addition to the processing abilities of the printer 4 and scanner 2, and assigns a greater amount of processes to the scanner 2.

According thereto, the time required for the printing process can be reduced according to the status of use of the printer 4.

Embodiment 2

Figure 4:
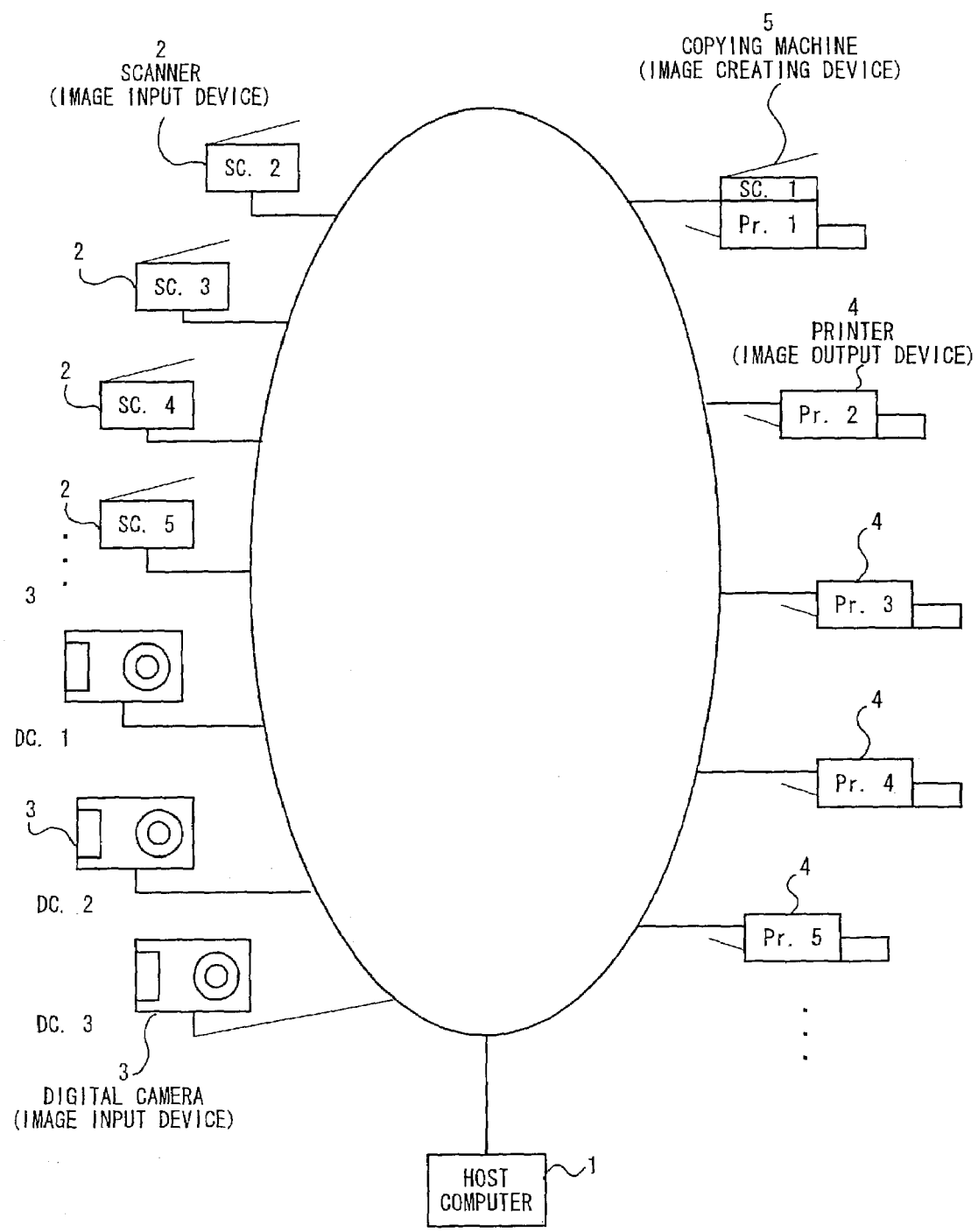
FIG. 4 is an explanatory view showing the configuration of the printing system according to embodiment 2 of the present invention.

FIG. 4 is an explanatory view showing the configuration of the printing system according to embodiment 2 of the present invention.

As shown in FIG. 4, the printing system according to embodiment 2 of the present invention comprises a host computer (or server) 1 functioning as a control unit, a plurality of scanners 2 (SC2, SC3, SC4, SC5 . . . ) functioning as image input devices, a plurality of digital cameras 3 (DC1, DC2, DC3 . . . ) functioning as image input devices, a plurality of printers 4 (Pr2, Pr3, Pr4, Pr5 . . . ) functioning as image output devices, and a copying machine 5 functioning as image forming device (equipped with a scanner SC1 and a printer Pr1), all of which are connected via a network.

Each scanner 2 functioning as image input device is equipped with a document platform, an optical scanning unit, a CCD (charge coupled device) and so on, which is capable of generating image data by reading in the original image.

Each digital camera 3 functioning as image input device is equipped with a lens, a CCD and so on, which is capable of generating the image data of the object or scenery etc. photographed by a user.

Each printer 4 functioning as image output device prints an image on a sheet of paper based on the image data generated by the scanner 2 or the digital camera 3.

The image data used for printing by the printer 4 is obtained by providing a predetermined image processing to the image data generated by the scanner 2 or digital camera 3.

This image processing is necessary for truly reproducing the original image through printer 4, and it includes plural processes of the image such as A/D conversion and various corrections (as will be described in detail later).

Further, these image processes are set to be shared by the scanner 2, the digital camera 3 and the printer 4.

The copying machine 5 functioning as the image forming device is a combo-type copier having the functions of both the scanner 2 and the printer 4.

The host computer 1 functioning as the control unit controls the scanners 2, digital cameras 3, printers 4 and copying machine 5 so as to execute printing, and is the nerve center of the present printing system.

The host computer 1 recognizes and stores in a hard disc not shown the type (model information) of each scanner 2, digital camera 3, printer 4 and copying machine 5, the various image processing that can be performed by each scanner 2, digital camera 3, printer 4 and copying machine 5, and the characteristic values (details of which will be described later) of the items of image processing appropriate for each scanner 2, digital camera 3, printer 4 and copying machine 5, respectively.

The timing of this recognition is when each scanner 2, digital camera 3, printer 4 and copying machine 5 is connected to the printing system of the present invention, that is, at the initial status.

It is also possible for the above-mentioned functions of the control unit to be equipped in a system controller (not shown) that the printer 4 holds.

Next, we will explain the items of image processing that are required for the image data generated by the scanner 2 or digital camera 3 to be printed by the printer 4.

In the following example, the scanner 2 is used as the image input device (refer to FIG. 14).

The scanner 2 functioning as the image input device generates an input image data by performing A/D conversion of the RGB signals of the reflected light image, and the image data is transmitted to the printer 4.

The items of image processing in this example are shading compensation, gamma correction, region isolation, black generation of each region, color correction, filter/zoom processing, and halftone processing.

Shading compensation is a process of eliminating various distortions caused by the lighting system, the imaging system and the image pickup system of the scanner 2.

Gamma correction is a process of correcting the signal strength of the input image data so that the required density is achieved for each tone.

Gamma correction is performed to prevent the inaccurate tone variation that will be caused when the signal strength of the input image data 11 is used as it is without correction.

Region isolation is a process of isolating the total region of the image data into text region, dot region and photograph region.

Black generation is a process of generating K (black) signal from an image data comprising three colors (for example, C (cyan), M (magenta) and Y (yellow)).

In the black generation process, the means for generating black is switched according to the result of region isolation.

According to a common black generation, the black generation curve as expressed by the following formula is utilized.

In the formula, K represents the black generation quantity, and C, M and Y represent the density (data obtained by complimentary inverting RGB signals) in the image data.

$$K=Gamma(min(C, M, Y))$$

Color compensation is a process of removing and eliminating the color turbidity based on spectral characteristics of the C, M, Y color material components including unnecessary absorption components, thereby improving the color reproductivity of the output image.

Filter processing is a process of correcting the spatial frequency characteristics by a spatial filtering process using a digital filter, thereby suppressing the generation of graininess degradation, blur, moiré etc. appearing in the output image.

Zooming is a process of enlarging/shrinking the image based on the signal the user inputs through an operation panel equipped to the scanner 2 functioning as image input device.

Halftone processing is a process of providing either a binarization or a multivalue processing to the image data using a predetermined screen.

The above-explained items of image processing are assigned to individual devices. For example, shading compensation and gamma correction are assigned to be executed by scanner 2, and the rest are assigned to be executed by printer 4.

Next, the printing process according to the present printing system will be explained.

According to the present printing system, for example, the user uses either one scanner 2 or one digital camera 3 as image input device to generate image data, and then the user selects the printer 4 to be used.

Thereafter, the host computer 1 functioning as control unit controls the selected scanner 2 or digital camera 3 to have the image data sent to the selected printer 4.

Further, according especially to the present printing system, the host computer 1 recognizes the model of scanner 2 or digital camera 3 used as image input device, and according to the recognized model, sets up the image processing items to be executed by the printer 4 functioning as image output device.

Figure 5:
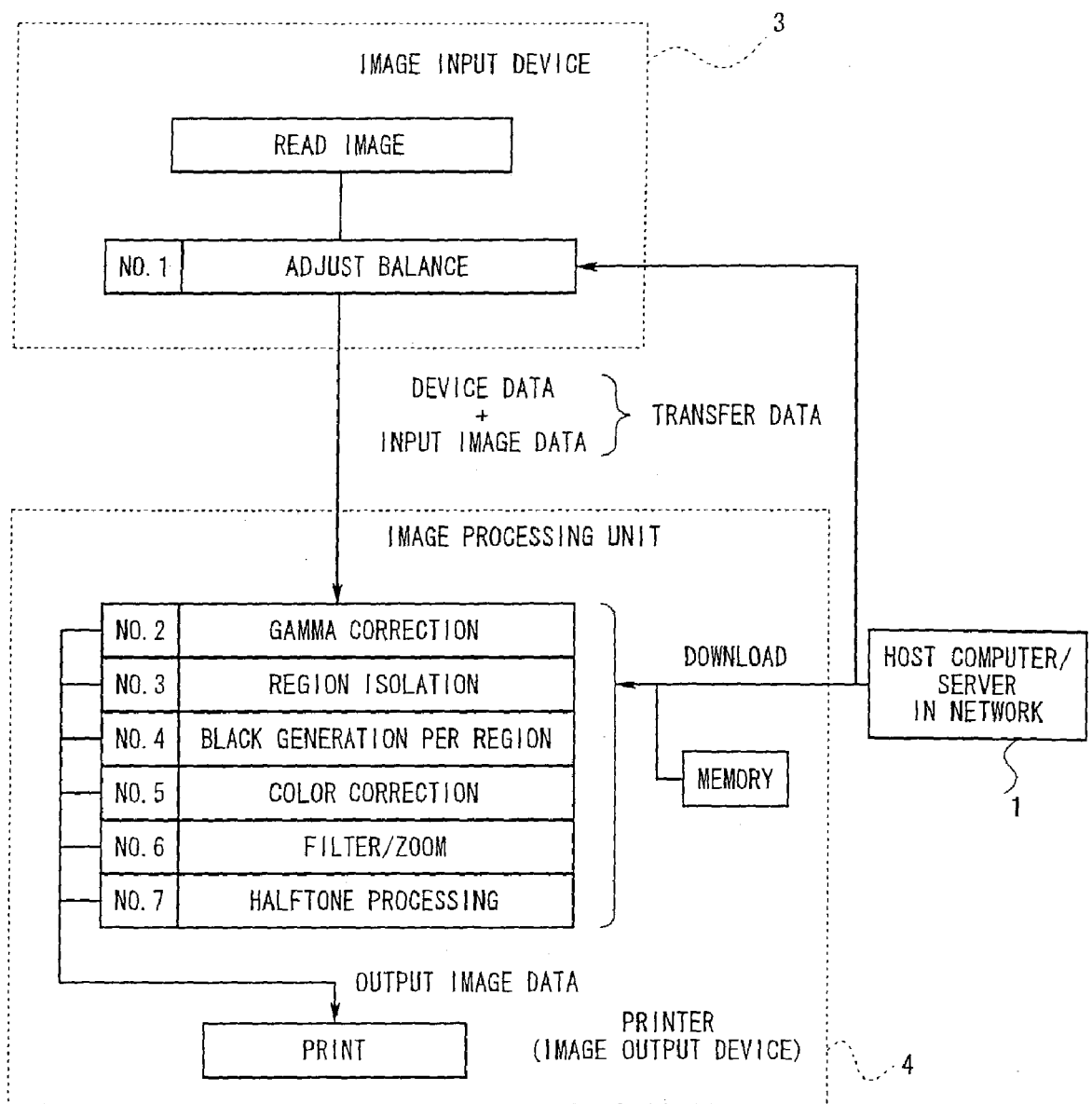
FIG. 5 is an explanatory view showing the contents of the image processing items to be performed by the image input device and the image output device, respectively, when the image input device is a digital camera according to the printing system of embodiment 2.

FIG. 5 explains the items of image processing to be executed by printer 4 when the image input device utilized in the printing system of embodiment 2 is a digital camera 3.

Figure 6:
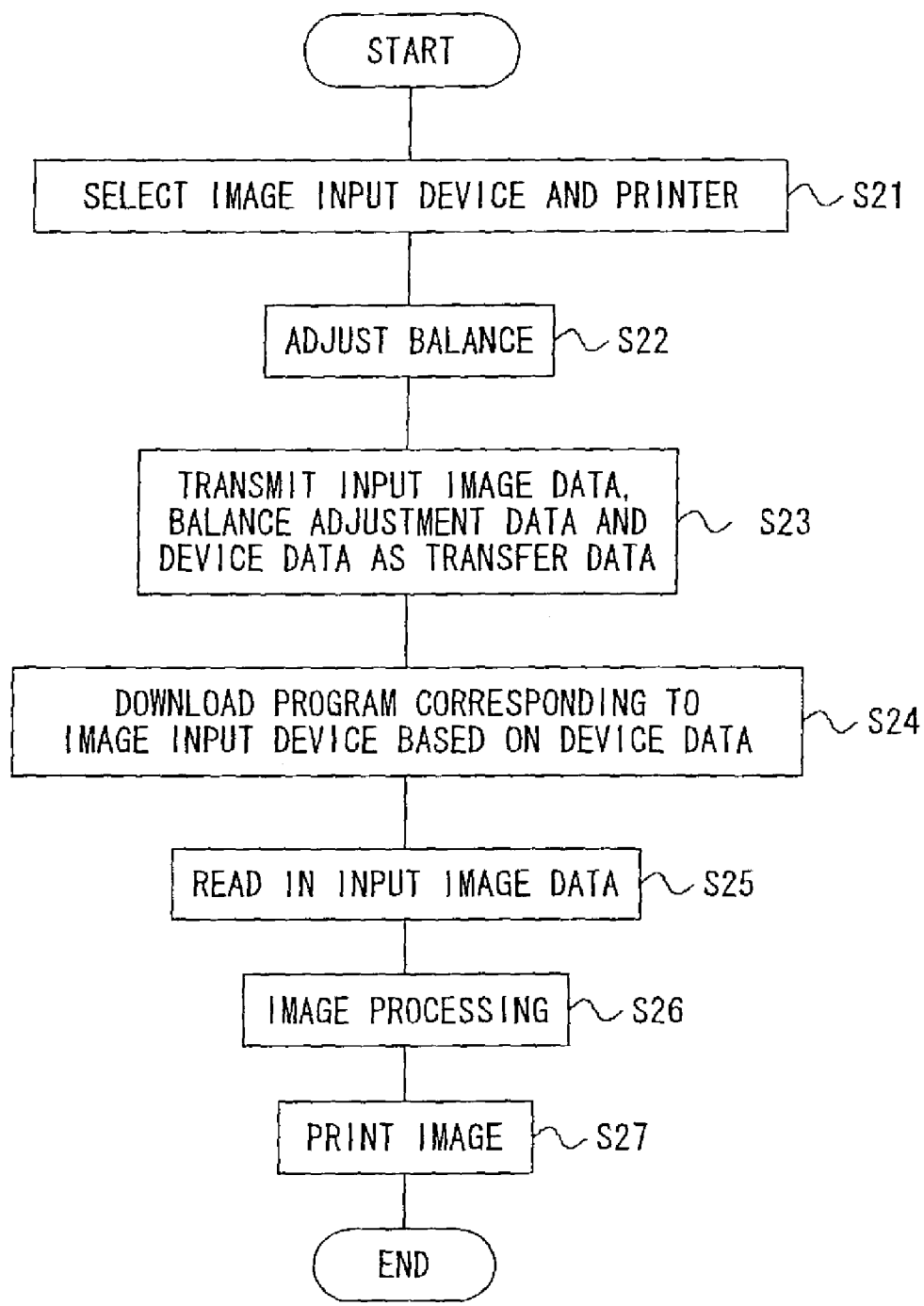
FIG. 6 is a flowchart showing the flow of the printing process when a digital camera is selected according to the present printing system.

FIG. 6 is a flowchart showing the flow of the printing process when the digital camera 3 is selected as image input device, similar to FIG. 5.

The download performed by the image input device (digital camera 3) or image output device (printer 4) which will be described hereinafter is required to be performed only when the image input device or image output device does not have the program for executing necessary processing (for example, in the memory of the device).

As shown in FIG. 6, according to the present printing system, when the user selects the printer 4 to be used and the digital camera 3 storing the image data to be printed (step S21), the host computer 1 orders the digital camera 3 to transmit to printer 4 as transfer data the information that the selected image input device is a digital camera 3 (device information) and the image data generated by the digital camera 3 (input image data) (step S23).

Figure 14:
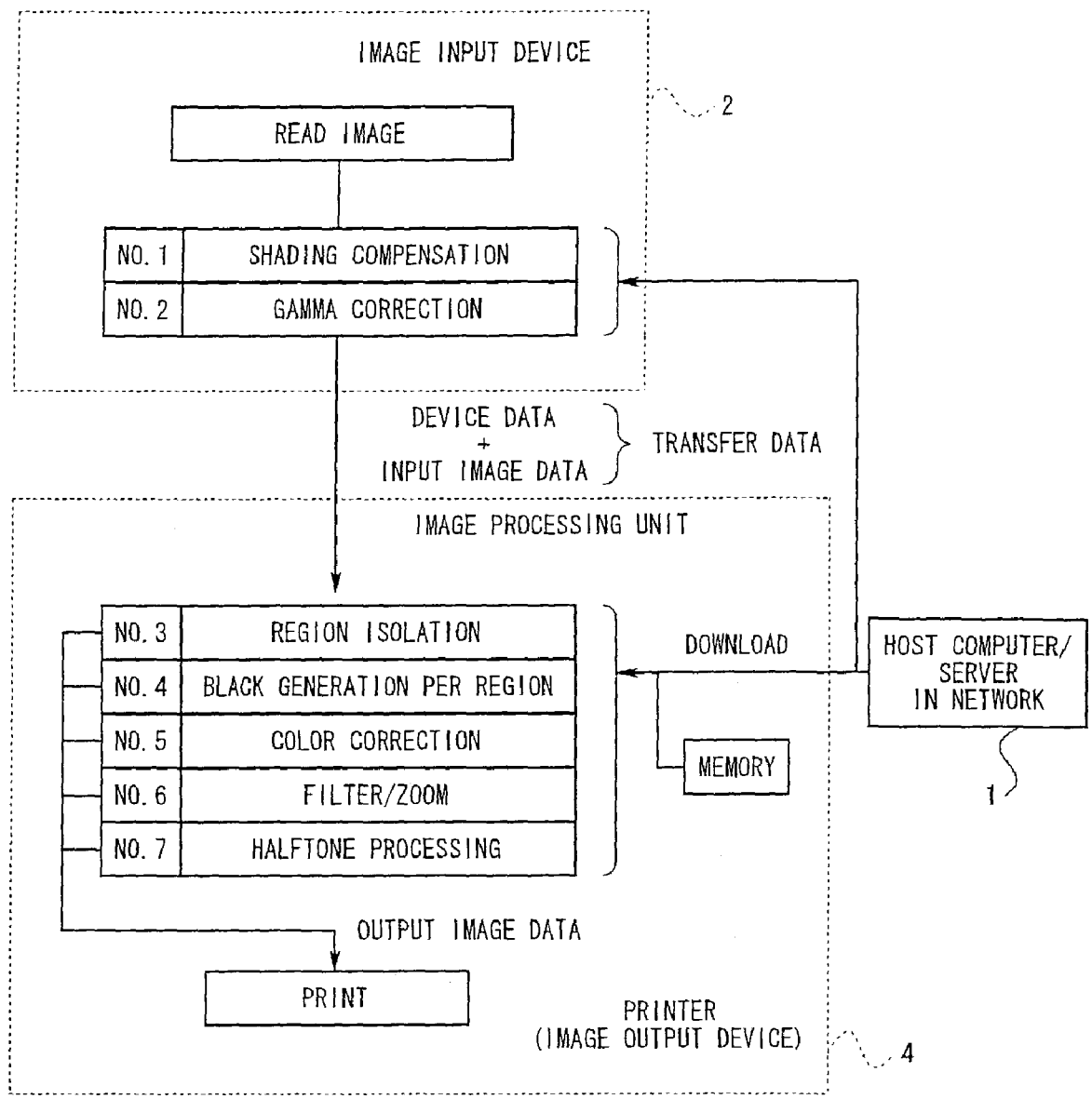
FIG. 14 is an explanatory view showing the contents of the image processing items to be performed by the image input device and the image output device, respectively, when the image input device is a scanner in the present printing system.

If the image input device is a scanner 2, the image input device is assigned to perform shading compensation and gamma correction as illustrated in FIG. 14, but if the image input device is a digital camera 3, balance adjustment and scaling adjustment etc. are performed when generating the input image data, before the input image data is stored in the memory of the digital camera 3 (step S22).

Thereafter, the aforementioned items of image processing are performed to the input image data stored in the memory of the digital camera 3.

Balance adjustment includes for example the following processes.

(1) Brightness Control

The contrast level of the colors is adjusted. The colors become brighter as the numeric value increases.

(2) Contrast Control

The ratio of brightness of the bright portion in contrast to the dark portion of the image is adjusted. When the contrast is increased, the colors become bold and the image becomes clear. When the contrast value is too low, the difference between the brightness and the darkness of the image do not appear clearly.

(3) Saturation Control

The vividness and somberness of the colors are adjusted. When the numeric value becomes higher, the colors become more vivid.

(4) Color Balance Control

This is to enhance a specific color, or to weaken the color tone (the dark/light, strong/weak of the colors, color shade, tone).

(5) Tone Balance Control

When the image is too dark or too bright, tone balance is adjusted to change the balance of color tone range of the image, and to control the contrast.

Further, scaling adjustment is performed to change the size of the image data.

Then, the host computer 1 orders the printer to acquire (download) a program (program for performing necessary image processing) corresponding to the selected input device (digital camera 3) based on the device information transmitted to printer 4 (step S24), and then orders the printer to read in the input image data (step S25).

Thereafter, the host computer 1 orders the printer 4 to process the input image data by the download program and print out the same (steps S26 and S27).

Instead of ordering the device to acquire (download) the program corresponding to the selected image input device, the host computer can alter the parameters for image processing.

As explained, the present printing system is equipped with a host computer 1 for ordering the scanner 2, digital camera 3 and printer 4 to execute the necessary image processing, the host computer capable of setting up the items (steps) of image processing according to the model of scanner 2 or digital camera 3 used as image input device.

According further to the present printing system, the share of items of image processing assigned to the scanner 2 or digital camera 3 functioning as image input device can be altered according to the model information of scanner or digital camera used.

For example, when plural scanners 2, printers 4 and a host computer 1 is connected to the network, the host computer 1 is required to identify each scanner 2 and printer 4 and to set up information required for downloading the necessary programs.

The host computer 1 functioning as control unit judges the processing ability of the image input unit based on the information on the device stored thereto in advance, and selects the program(s) to be downloaded.

Moreover, at this time the ability of the printer 4 functioning as the image output device can also be judged to select the most suitable program.

The model information of image input devices can be stored for example as a list in the host computer 1.

When new information is to be added to the list, the information is input to the host computer either via the network or directly.

This list is associated with the most suitable programs for each image input device, respectively.

Upon reading an image and printing the same, the image input device communicates its model information to the host computer 1.

The host computer 1 selects the most appropriate program from the model information list stored in advance based on the transmitted model information, and downloads. the program to the printer 4.

As mentioned, according to the present printing system, the host computer 1 can set up the share of image processing items to be performed by the image input device (scanner 2 or digital camera 3) based on the processing ability thereof, so as to shorten processing time. The printer 4 functioning as image output device can execute the yet-to-be-performed image processing items other than the ones performed to the input image data by the image input device (executed items).

According further to the present printing system, even if the image input device includes the same model of scanners 2, the host computer 1 can recognize the processing ability of the selected scanner 2 (data processing ability; a value determining the speed required for image processing) and to change the share of image processing items to be performed by the scanner according to its processing ability.

For example, if the selected scanner 2 is capable of performing gamma correction in a short time (when its processing ability is high), the host computer 1 can delete the corresponding image processing item (gamma correction) from the image processing items assigned to the printer 4.

On the other hand, if the selected scanner 2 has a low processing ability and takes a long time to execute gamma correction, the host computer 1 can assign this item of image processing (gamma correction) to be performed by printer 4.

Further, the host computer 1 is set to store in its memory the processing abilities of each image input device (scanners 2, digital cameras 3) and image output device (printers 4) during the initial status.

In other words, since the host computer 1 stores in advance the processing abilities of each image input device (scanners 2, digital cameras 3) and image output device (printer 4), it is capable of determining the share of processing items to be assigned to each device.

Further, the image input device includes the processed items data to the transfer data when transferring the image data to the printer 4 (image output device).

Thereby, the printer 4 can easily recognize which items are to be executed thereby (the yet-to-be-performed processing items).

It is preferable for the image input device to add the processed items data to the header portion of the transfer data.

The header portion is the first portion that the printer 4 decodes.

Thus, the printer 4 can recognize quickly which items it must execute.

Thus, the image processing can be started without delay.

Next, we will explain another printing system according to embodiment 2 of the present invention.

As for members having the same functions as the members in above-explained embodiment 2, the same reference numbers are assigned thereto and the explanations thereof are omitted.

The present invention shall not be limited by the illustrated embodiments.

The present printing system is capable of setting up the image processing items according to the information included in the image data read in through the image input device.

For example, when the image input device determines the input document type, the host computer 1 functioning as control unit sets up the image processing items to be performed by printer 4 so that appropriate processes according to the document type is executed.

Figure 7:
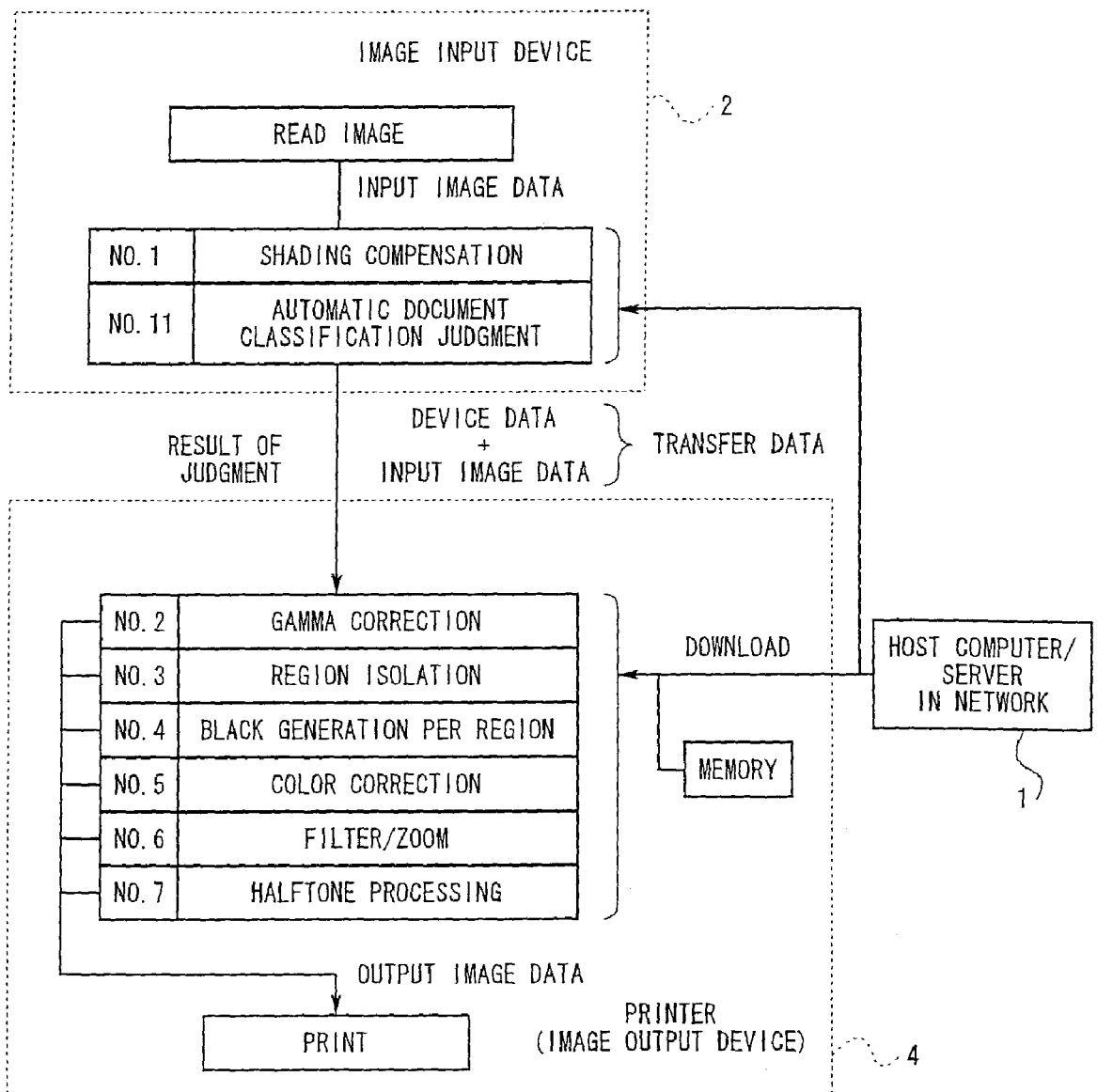
FIG. 7 is an explanatory view showing the contents of image processing to be executed by the image output device based on the result of document classification according to the printing system of embodiment 2.

FIG. 7 is an explanatory view explaining the scanner 2 (image input device) determining the document type of the image data being read in, and based on the determined result, the image processing items to be executed by the printer 4 (image output device) is set up.

Figure 8:
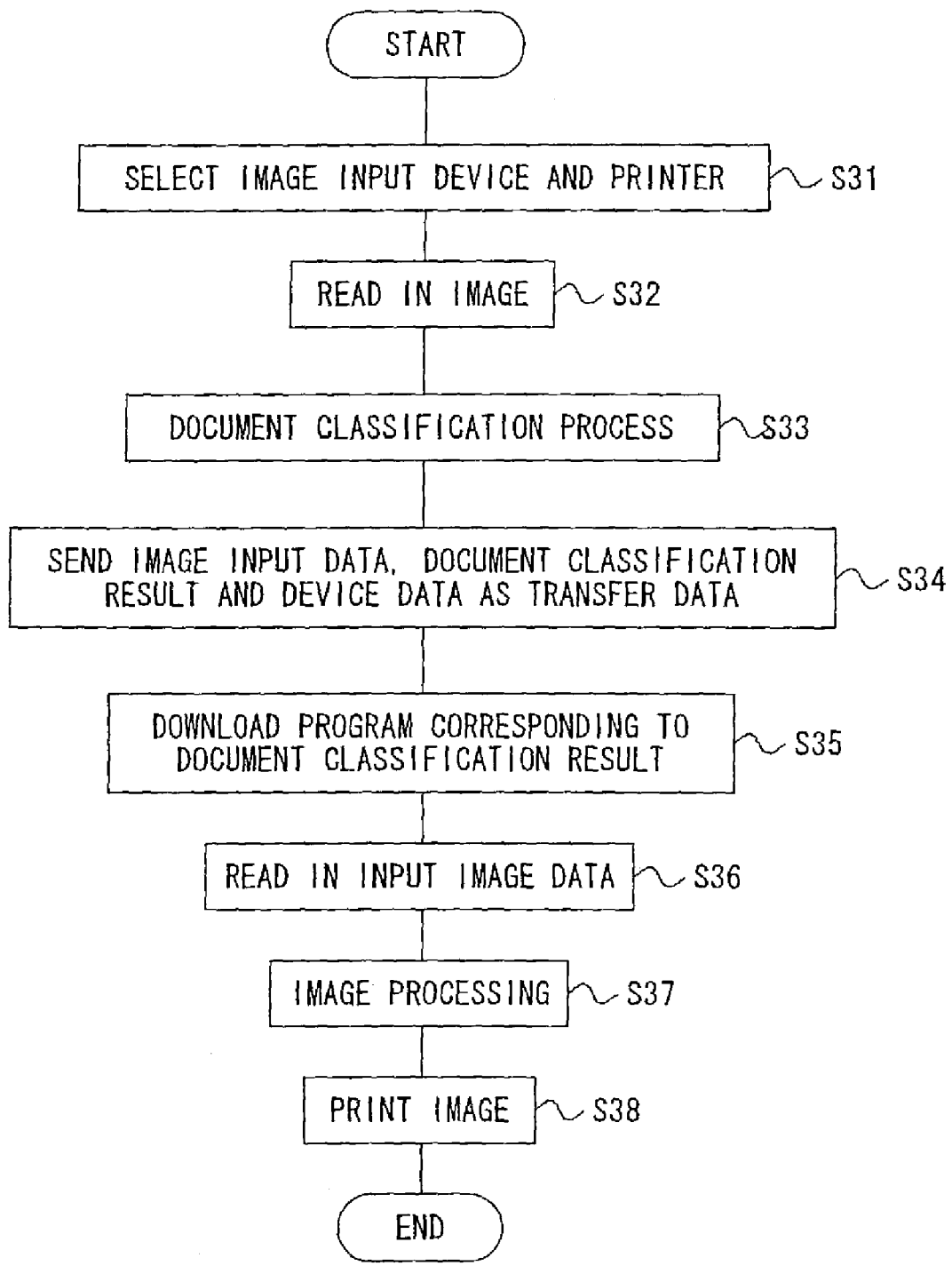
FIG. 8 is a flowchart showing the flow of the printing process based on the document classification result according to the present printing system.

Further, similar to FIG. 7, FIG. 8 illustrates a flowchart showing the flow of the printing process based on the determined result of document classification.

As shown in FIG. 8, in the printing system according to the present invention, at first the user selects the printer 4 and the scanner 2 to be utilized (step S31).

Then, the host computer 1 orders the selected scanner 2 to read in the image (step S32) and to perform the judgment of the document classification, as explained in detail hereinafter (step S33).

Thereafter, the host computer 1 orders the scanner 2 to transmit to the printer 4 functioning as image output device as transfer data the information that the selected image input device is a scanner 2 (device information) and the image data generated by the scanner 2 (input image data) (step S34).

Further, the host computer 1 orders the printer 4 to download the program corresponding to the result of document classification being transmitted thereto (step S35), and then orders the printer to read in the input image data (step S36).

Thereafter, the host computer 1 orders the printer 4 to perform image processing to the input image data by the program being downloaded in the previous step, and then to print out the same (steps S37, S38).

The above-mentioned download performed by the image input device (scanner 2) and image output device (printer 4) should only be performed when the programs required for image processing are not stored therein (for example in their memory).

Moreover, in order to use the program(s) as explained above, it is preferable for the host computer 1 to store all the programs necessary for executing all the items of image processing.

Further, it is preferable for the image input devices (scanners 2) and image output devices (printers 4) to have installed thereto programs enabling download of the necessary program(s).

As explained, according to the present printing system, the host computer 1 sets up the items of image processing based on the determined result of the document type performed by scanner 2.

Thereby, the printer 4 can be set to execute the most appropriate image processing according to the document type, and thus the output image is improved in quality.

For example, if the image input devices (scanners 2 and digital cameras 3) are capable of judging the image being represented by the image data that is input thereto (for example, whether the image is a portrait or a scenery), it is possible to set up the image processing items to be executed to the image data based on the represented image type.

The above explanation refers to the example where the document classification determination is included in the image data read in by the image input device, but the present invention is not limited to such example.

For example, the information included in the image data can be the result of region isolation. When the image input device is a digital camera 3, the image data includes information related to brightness, saturation, etc.

Brightness information included in the image data can show, for example, that the image data being read in includes a highlight region and an under region (dark region).

In such case, at the printer 4, the contrast is adjusted so that the highlight region does not become completely white and that the under region does not become black.

Color saturation information included in the image data can show, for example, that the image data being read in includes a vivid color.

In such case, during color correction, a method for compressing the color region maintaining its saturation is selected so as not to regenerate the vivid color as a somber color.

Further, according to the present printing system, it is possible to change the assigned load of image processing items according to the information included in the image data being read in through the image input device.

For example, when a digital camera 3 is used as the image input device to take in an image, and when the taken image is too dark, the user may request correction when printing out the image.

In such case, when starting the printing, the digital camera 3 performs sampling of the shooting condition and the intake image data to compute the brightness and color saturation.

These data (shooting condition, brightness, color saturation, correction request from user) are transmitted to the host computer 1.

Based on the transmitted information and the information on the printer 4 functioning as the image output device, the host computer 1 analyzes the necessary processes, determines the most suitable processes to be executed by the digital camera 3 and the printer 4, respectively, and orders execution of the processes.

For example, if the input image to be processed is generally blurry and the user wishes to correct the blur, the system selects for the filtering process a program that enables to perform a more effective enhancement treatment compared to the ordinary filtering process.

Moreover, if the image needs to be treated partially, the system can select region isolation process.

Of course, all the ordinary image processing programs (color correction, zooming, halftone processing etc.) are selected too, which are downloaded to the image output device (printer 4).

Further, if it is not possible to select the necessary programs based only on the transmitted data, the host computer 1 (control unit) requests additional data to the digital camera 3 (image input device).

In this case, when the host computer 1 has the program for acquiring additional data, it downloads that program to the image input device (digital camera 3) and orders execution of processes at the image input device.

According to embodiment 2 of the present invention, the host computer 1 sets up the items of image processing or the share thereof for the printer 4.

However, according to another example, the same can be set up by a control unit (system controller) that the selected printer 4 comprises.

Moreover, the above-mentioned setup of image processing items or share of assignments by the host computer 1 can be formed as a program.

Further, this program can be stored in a recording medium that can be read out by the host computer 1.

This recording medium can be a program medium such as a ROM (read only memory) storing the processes to be performed by the host computer 1.

In another example, the system can be equipped with a program reading device as an exterior storage unit, and the recording medium can be a medium that can be inserted to the program reading device.

In any case, the host computer 1 can access the stored program for execution of the same, or the host computer 1 can read out the program and have the program downloaded to the program storage area of the host computer 1 for execution of the same.

Further, the program to be downloaded is stored in advance in the device.

The above-mentioned program medium is a recording medium separable from a device body, and can be any of the following possible media: tapes such as magnetic tapes and cassette tapes; magnetic discs such as floppy (registered trademark) discs and hard discs; discs including optical discs such as CD-ROM, MO, MD and DVD; cards such as IC cards (including memory cards) and optical cards; and semiconductor memories such as mask ROM, EPROM (erasable programmable read only memory), EEPROM (electrically erasable programmable read only memory), and flash ROM; which are capable of storing the program in a static manner.

Further, according to embodiment 2 of the present invention, the printing system is formed so as to be able to connect to a communication network including internet, so the recording medium can also be designed to store a program in a flux manner such as by downloading the necessary program via the communication network.

In such case where the necessary programs are to be downloaded via a communication network, the downloading program can either be stored in the device in advance or be installed from a separate recording medium.

As a result, the recording medium storing the program(s) for setting up the image processing items or assigning the same to devices can be read out from a host computer 1 or a system controller of the printer 4 so as to enable setup of the image processing items and assignment of the items to devices.

We will now explain the process of determining the type of document being read in performed by the scanner 2.

Figure 9:
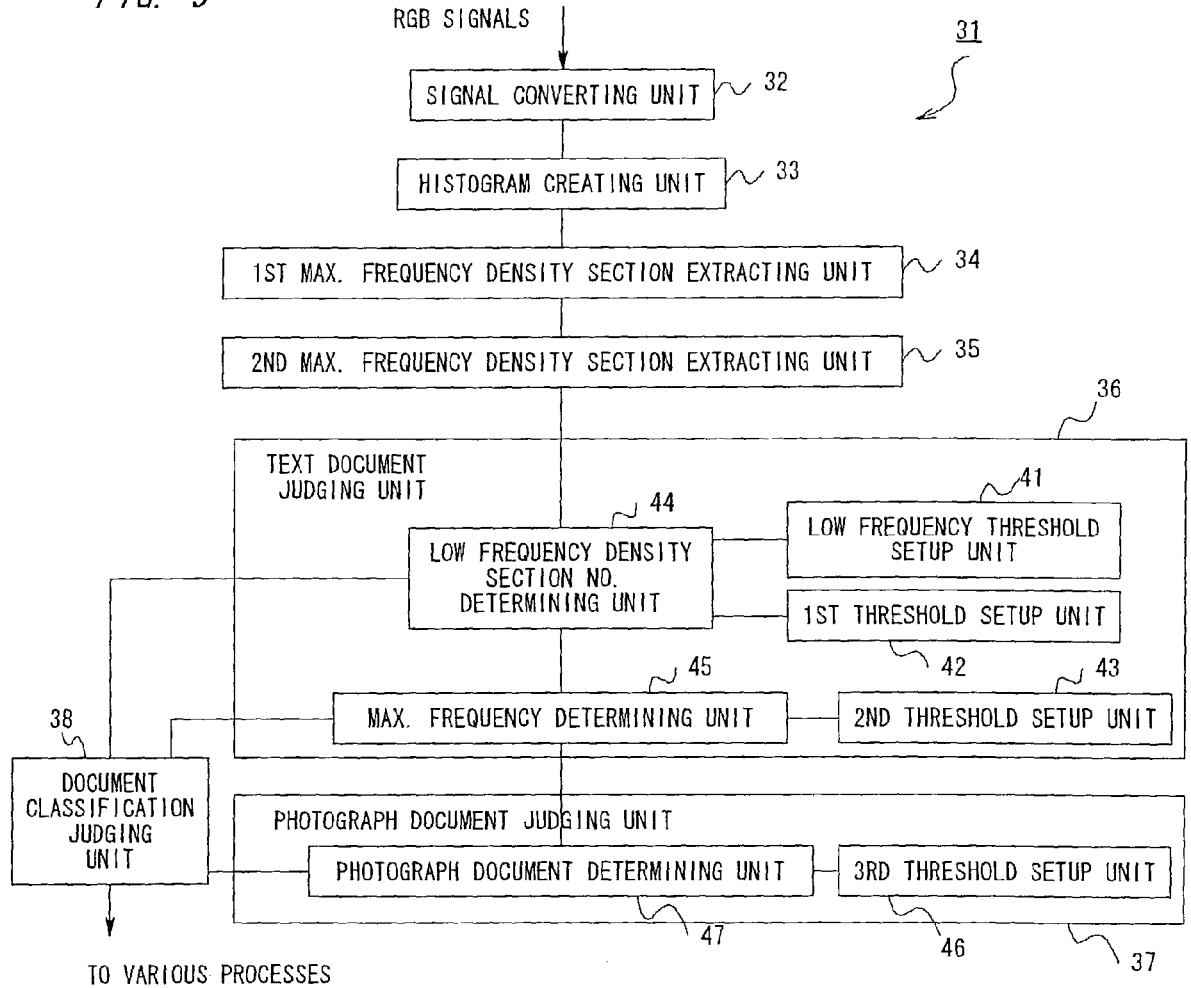
FIG. 9 is a simplified block diagram showing the automatic judging unit of the document classification of the scanner according to the present printing system.

FIG. 9 is a block diagram showing the outline of an automatic judging unit for judging the document type by the scanner according to the printing system of the present invention.

At first, the scanner 2 performs an A/D conversion of the RGB signals which are the reflected light image of the document and thereby generates an input image data, and then processes the RGB signals that have received shading compensation at the automatic judging unit 31 for judging the document classification, as shown in FIG. 9.

The automatic judging unit 31 for judging the document classification comprises, as shown in FIG. 9, a signal converting unit 32, a histogram creating unit 33, a first maximum frequency density section extracting unit 34, a second maximum frequency density section extracting unit 35, a text document judging unit 36, a photograph document judging unit 37, and a document classification judging unit 38.

The signal converting unit 32 converts the RGB reflectance signals into density signals, and converts the RGB density signals into complimentary-inverted C, M, Y signals.

The histogram creating unit 33 creates by the steps mentioned hereafter a density histogram illustrating the relation between the density of each pixel of the document image and the frequency thereof, based on the image data being input from the signal converting unit 32 (respective C, M, Y signals).

The first maximum frequency density section extracting unit 34 extracts as first maximum frequency value (MAX1) the maximum frequency value in the density histogram created by the histogram creating unit 33, and further extracts as a first maximum frequency density section the density section in which MAX1 belongs.

The second maximum frequency density section extracting unit 35 extracts a second maximum frequency value (MAX2) from density sections excluding the first maximum frequency density section extracted by the first maximum frequency density section extracting unit 34 and the density sections adjacent thereto, and extracts as second maximum frequency density section the density section in which MAX2 belongs.

In other words, the second maximum frequency density section extracting unit 35 extracts as MAX2 the second largest frequency value in the density section that is not adjacent to the density section from which MAX1 is extracted.

The text document judging unit 36 judges whether the input document is a text document or not based on the density histogram.

More specifically, the text document judging unit 36 judges whether the document is a text document or not based on at least either MAX1 or the number of density sections having a frequency value equal to or below a predetermined value (a low frequency threshold mentioned hereinafter) in the density histogram.

The photograph document judging unit 37 judges whether the input document is a photograph document or not based on MAX1 and MAX2 mentioned above.

In the photograph document judging unit 37, there is no distinction between a printed photograph and a photographic-paper photograph when determining whether the document is a photograph document.

The document classification judging unit 38 finally judges the document classification based on the judgment results of each color (C, M, Y) by the text document judging unit 36 and the photograph document judging unit 37.

As shown in FIG. 9, the above-mentioned text document judging unit 36 comprises a low frequency threshold setup unit 41, a first threshold setup unit 42, a second threshold setup unit 43, a low frequency density section number determining unit 44, and a maximum frequency value determining unit 45.

The low frequency threshold setup unit 41 sets up the low frequency threshold used for extracting the density sections having low frequency.

The first threshold setup unit 42 sets up a first threshold comparable with the number of low frequency density sections extracted by comparing the frequencies of each density section in the above-mentioned density histogram with the above-mentioned low frequency threshold.

The second threshold setup unit 43 sets up a second threshold used for judging what the ratio of MAX1 is to the total frequency, that is, the total number of pixels.

The low frequency density section number determining unit 44 extracts and counts the density sections that have smaller frequencies than the above-mentioned low frequency threshold in the density histogram, and compares the number of low frequency density sections with the first threshold set up by the first threshold setup unit 42, thereby judging whether the input document is a text document or not.

The maximum frequency value determining unit 45 compares the second threshold set up by the second threshold setup unit 43 with MAX1, and by determining the ratio of MAX1 to the total frequencies, judges whether the input document is a text document or not.

Further, as shown in FIG. 9, the photograph document judging unit 37 comprises a third threshold setup unit 46 and a photograph document judging unit 47.

The third threshold setup unit 46 sets up a third threshold used for judging whether the document is a photograph document or not by photograph document judging unit 47.

The photograph document judging unit 47 compares the total frequencies, the result obtained from MAX1 and MAX2 and the third threshold, so as to determine whether the input document includes only photographs, or a text/photograph document where the text and photograph exist together.

Next, the document classification automatic judging process performed by the document classification automatic judging unit 31 formed as above will be explained with reference to the flowchart of FIG. 10.

First, a pre-scan is performed, and the RGB signals corresponding to the total pixels of the input document are converted into C, M, Y signals of complimentary colors at the signal converting unit 32 (step S41).

Figure 11:
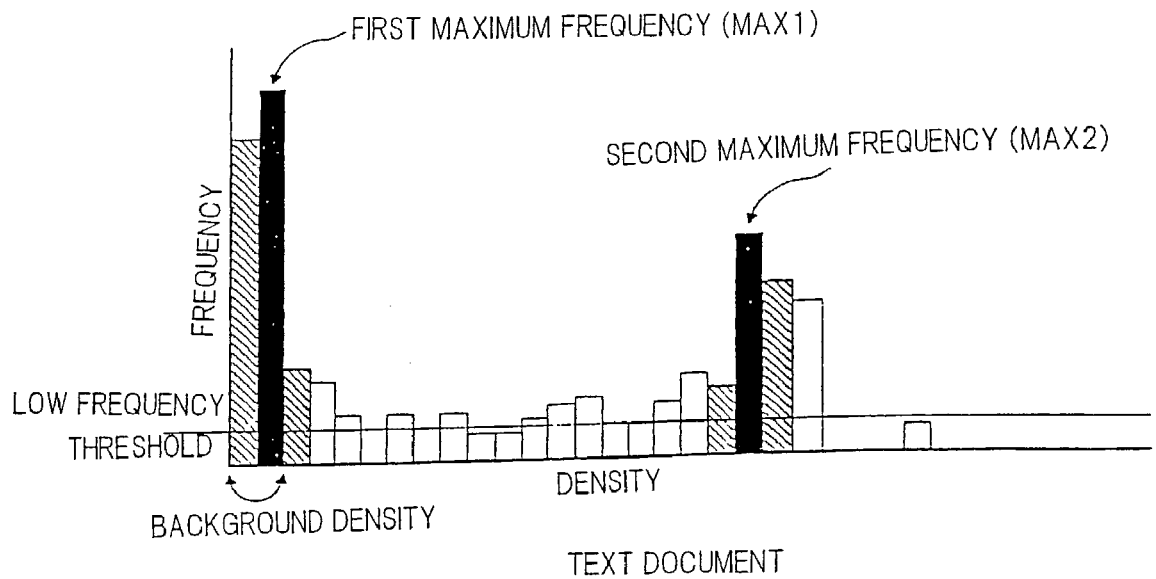
FIG. 11 shows one example of the density histogram of a text document created by the histogram creating unit of the automatic document classification judging unit.
Figure 12:
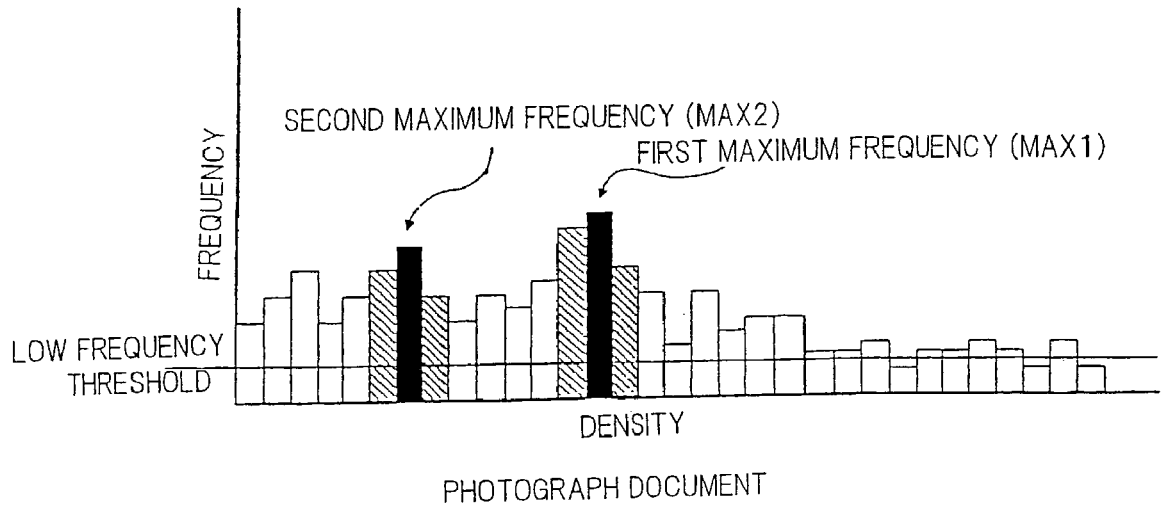
FIG. 12 shows one example of the density histogram of a photograph document created by the histogram creating unit of the automatic document classification judging unit.
Figure 13:
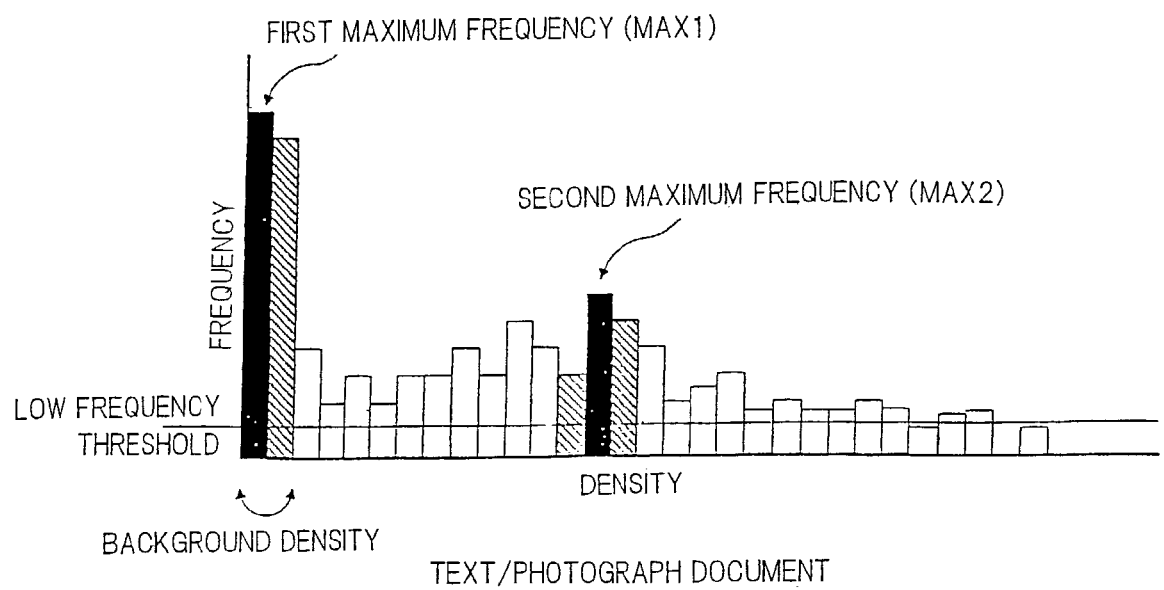
FIG. 13 is one example of the density histogram of a text/photograph document created by the histogram creating unit of the automatic document classification judging unit.

Next, using the signals converted in step S41, the histogram creating unit 33 creates a density histogram as shown in FIGS. 11 through 13 for each color (step S42).

FIGS. 11 through 13 show an example of a density histogram of a text document, a photograph document, and a text/photograph document, respectively, and the details for creating the density histograms will be described in detail hereinafter.

The first maximum frequency density section extracting unit 34 selects a frequency section having the maximum frequency (first maximum frequency density section) based on the density histogram created in step S42, and extracts the first maximum frequency value (MAX1) in the selected density section (step S43).

Thereafter, the second maximum frequency density section extracting unit 35 selects a frequency section (second maximum frequency density section) having the maximum frequency value excluding the density section from which MAX1 is extracted and the density sections adjacent to said MAX1 density section, and extracts the frequency value of the selected density section, in other words, extracts the second maximum frequency value (MAX2) (step S44).

Next, the low frequency density section number determining unit 44 compares the frequency values of each section of the density histogram with the low frequency threshold prepared in advance by the low frequency threshold setup unit 41 for detecting the density sections having low frequencies, and counts the density sections having smaller frequency than the low frequency threshold, then judges whether the number of low frequency density sections being counted is equal to or greater than a first threshold (step S45).

When in step S45 the number of low frequency density sections equals or exceeds the first threshold, the low frequency density section number determining unit 44 judges that the input document is a text document (step S50).

The reason why the system is capable of judging that the input document is a text document based on the above conditions will be explained later.

On the other hand, when in step S45 the number of low frequency density sections are smaller than the first threshold, in other words, when the input document is not judged as being a text document, the maximum frequency value determining unit 45 compares MAX1 with the second threshold to determine the ratio of MAX1 to the total frequency (step S46).

If MAX1 is equal to or greater than the second threshold in step S46, the maximum frequency value determining unit 45 judges that the input document is a text document (step S50).

Further, the reason why the present system is capable of judging that the input document is a text document based on the above conditions will be explained later.

Next, if MAX1 is smaller than the second threshold in step 46, that is, if the document is not judged as text document by steps S45 and S46, the procedure advances to step S47 where the photograph document judging unit 37 judges whether the input document is a photograph document or not (step S47).

Instep S47, the photograph document judging unit 47 divides the total frequencies or total number of pixels by the difference between MAX1 and MAX2 (MAX1−MAX2), and judges whether that value is equal to or greater than the third threshold setup in advance by the third threshold setup unit 46.

If ALL/(MAX1−MAX2) is equal to or greater than the third threshold, the photograph document judging unit 47 determines that the input document is a photograph document (step S49).

Further, the reason why the present system is capable of judging that the input document is a photograph document based on the above conditions will be explained later.

Then, if the document is not determined to be a photograph document in the photograph document determination process of step S47, unit 47 judges that the input document image is of a text/photograph document where text and photograph are mixed in one document (step S48).

The process of above-explained steps S41 through S50 is performed for all the signals representing C, M and Y, respectively, and if the same results were achieved for at least two of the three color signals, the document classification judging unit determines that result as the final document classification of the input document (step S51).

However, if the same results could not be achieved for two color signals or more, the document classification judging unit 38 judges that the input document is a text/photograph document as the final result of document classification.

When according to steps S41 through S50 the classification of the document is determined, various image processing (gamma correction, region isolation, black generation for each region (black generation processing), color correction, filter/zoom processing, halftone processing) that follow the document classification automatic determination is performed based on the result of determined document classification, as shown in FIG. 7.

Then, before performing these processes, the host computer 1 assigns the image processing items to the scanner 2 and the printer 4 based on the processing ability of the image input device.

Moreover, according to the printing system of the present invention, the parameters for each image processing item are varied according to the classification of the document.

The examples of such variation will be explained below.

(A) When the Input Image Data is Determined as Text Document:
1. In gamma correction and halftone processing, more highlights are eliminated and the contrast is increased.
2. In region isolation, for example, the regions isolated as text region as line drawing etc. are judged to be of effective region isolation. On the other hand, even if the input is a text document, the classification may be erroneous according to document type, so regions isolated as dot regions of continuous tones or photograph regions are assumed as being isolated erroneously, and their isolation results are not reflected in the subsequent steps.
3. In color correction, if the text is determined as being a color text according to the above-mentioned region isolation processing, color correction is performed with weight on the color saturation.
4. In black generation, the amount of black generation is set greater for black texts.
5. In filtering, the parameters are switched so as for example to increase the enhance filter that enhances the edges, or to weaken the smoothing filter that removes the noise included in the image data.

(B) When the Input Image Ddata is Ddetermined as Photograph Document:
1. In gamma correction and halftone processing, highlights may be emphasized or tones can be increased.
2. In region isolation, the regions isolated as dot regions of continuous tones or photograph regions are judged to be of effective isolation. The regions isolated as text regions are assumed to be isolated erroneously, and their isolation results are not reflected in the subsequent steps.
3. In color correction, correction is performed with weight on tone based on the above-mentioned region isolation.
4. In black generation, the amount of black generation is reduced.
5. In filtering, the parameters are switched so as for example to weaken the enhance filter or to enhance the smoothing filter.

(C) When the Input Image Data is Determined as Text/Photograph Document:

In each of the processes, parameters intermediate those used in the text document processing and in the photograph document processing are used.

The intermediate parameters can also be varied so as to put weight on either the text or the photograph.

For example, in gamma correction and halftone processing, the above-mentioned intermediate parameters are used (however, if weight is put on texts, parameters closer to those for text document are used, and if weight is put on photographs, parameters closer to those for photographs are used) in order to remove highlights or control contrast.

Color correction is also performed so that the balance of color saturation and tone is appropriate.

In black generation, the amount of black generation is controlled so as not to influence the photograph image.

In region isolation, the region isolation results of each pixel are reflected in the process.

Next, the determination of document classification according to the flowchart of FIG. 10 will be explained in further detail with reference to the density histograms appearing in FIGS. 11, 12 and 13.

First, in the flowchart of FIG. 10, the generation of the density histogram in step S42 will be explained in detail.

Normally, when the image data being read in through the scanner 2 is an 8-bit data, a histogram having 256 levels of density each showing its frequency are created.

In present embodiment 2, the density having 256 levels are equally divided into 32 levels for simplification, as shown in the density histograms of FIGS. 11, 12 and 13.

Thus, hardware can be simplified greatly.

Moreover, in order to perform accurate image processing, it is also possible to increase the dividing number, or to further reduce the dividing number for simplification.

When dividing the density, it is preferable to divide the width of density sections evenly, but it is also possible to divide the density sections unevenly in a biased manner.

For example, it is possible to divide the density sections of particular importance to smaller widths.

In such case, the average value of frequencies in the divided density sections maybe computed as follows so that the difference in frequencies in an arbitrary density section between the density divided unevenly and that divided evenly is minimized.

When adding to the frequency of the density histogram, based on where the density of the pixel read in by the aforementioned pre-scan belongs to the divided density sections, one is added to the histogram frequency of the corresponding density section.

That is, when a certain density section is called "ai", the width of that density section is "n" and density section "ai" is composed of density sections D1-Dn, the frequency Hi in the arbitrary density section Di can be computed as follows:

$$Hi=(\Sigma hk)/n$$

(hk represents frequency in 256 levels included in density section Dk (wherein k is an integer from 1 to n))

Figure 10:
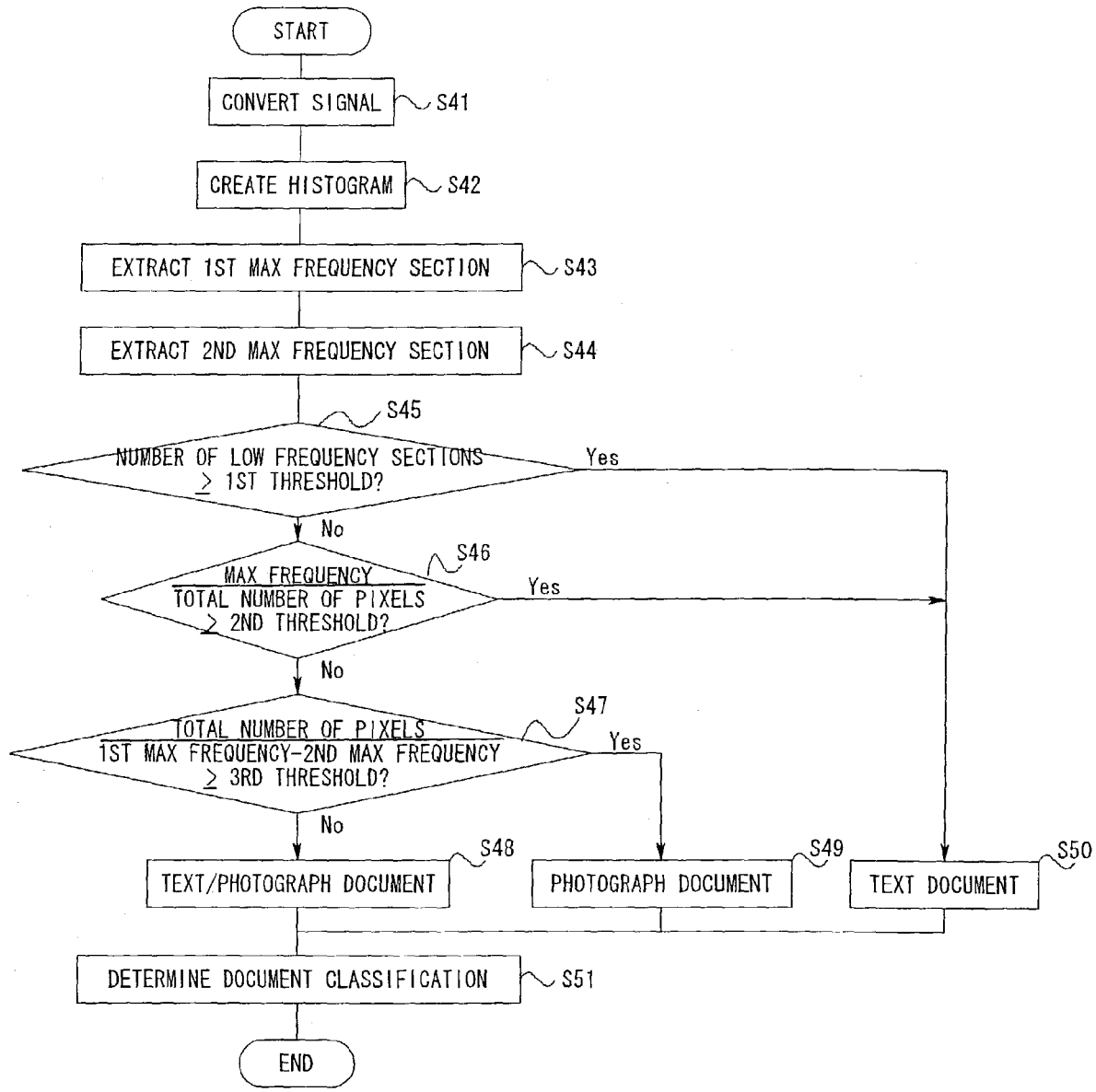
FIG. 10 is a flowchart showing the flow of the automatic document classification judging process according to the automatic judging unit of the scanner according to the present printing system.

Thus, the density histogram is created in step S42 of FIG. 10, and in the subsequent steps the document classification is determined using this density histogram.

Next, the reason why the input document can be judged as text document in steps S45 and S46 in the flowchart of FIG. 10 will be explained.

Generally, a text document is composed of texts (characters) and background.

Therefore, in the density histogram of a text document, the overall density tone width is reduced, while the frequencies in the density sections corresponding to the text and the background are high.

From the above, it can be concluded that one of the characteristics of a text document is that there are many low frequency density sections.

Therefore, in step S45 of FIG. 10, by extracting the density sections having a low frequency by comparing the frequency of each density section with the low frequency threshold, counting the number of extracted sections, and comparing that number with the first threshold to check how large (or how small) the number of sections having low frequency is, it is possible to determine whether or not the input document is a text document.

Further, the value of the low frequency threshold should preferably be close to zero.

However, the value of the low frequency threshold may be adjusted according to the size of the document.

Moreover, another characteristic of a general text document is that the ratio of the background in the whole document face is significantly large.

That is, if the first maximum frequency value (MAX1) extracted from the density histogram is close to the total frequency value, it means that the density section from which MAX1 was extracted corresponds to the background of the text document.

Therefore, in step S46 of FIG. 10, by comparing MAX1 with the second threshold set in advance so as to determine whether MAX1 is close to the total frequency value or not, the existence of a background in the document image can be determined if MAX1 exceeds the second threshold, and the system is capable of judging whether the input document is a text document or not.

Further, in embodiment 2 of the present invention, both steps S45 and S46 of FIG. 10 are performed, but it is also possible to judge a text document by performing only either step S45 or step S46.

Therefore, the judging of the text document can be performed either by using MAX1 or the number of density sections whose frequencies are lower than the predetermined value.

However, by performing both steps S45 and S46, the reliability of text document determination can be increased securely.

Though according to embodiment 2, the text document determination is performed in the order of step S45 and then step S46, but the two steps can also be performed in the reverse order.

Next, the reason why it is possible to determine whether the document is a photograph document according to step S47 of FIG. 10 will now be explained in detail.

In general, a photograph document has a wide density tone width and has little bias in the tone width, so as shown in FIG. 12, one characteristic of the density histogram showing a photograph document is that the width of the density tones is wide and that two or more heaps of nearly the same level exist.

Therefore, by extracting two of the density sections having the highest frequency from the density histogram and by setting the frequencies of the two density sections as MAX1 and MAX2, it is possible to determine by checking value (MAX1-MAX2) whether there exists two heaps of nearly the same frequency level in the density histogram.

Moreover, when the document is a text/photograph document where the photograph image occupies the most part of the document and the text appears only in small areas, the result of (MAX1-MAX2) maybe similar to that of a photograph document including only a photograph image.

However, to correspond to such case, the third threshold is set up so as to either process such input document as text/photograph document or to process it as photograph document.

The third threshold should preferably be decided based on the relationship with the document classification after measuring the value of (MAX1-MAX2) for as many documents as possible.

Moreover, it is considered that along with the change in size of the document, the value of (MAX1-MAX2) for judging the photograph document changes.

Therefore, in step S47 of FIG. 10, in order to reduce the effect of the variation of document size to the determination of document classification, the ratio of the total frequencies (ALL) to (MAX1-MAX2) is compared with the third threshold.

Thus, by dividing the total frequencies (ALL) or total number of pixels by (MAX1-MAX2), and by standardizing the same so as not to rely on the document size, it becomes unnecessary to set up the third threshold for each document.

Further in step S47 of FIG. 10, it is also possible to judge whether the document is a text/photograph document or not by comparing the total frequencies (ALL) with the value obtained by multiplying the third threshold to (MAX1-MAX2).

Further, there may be a case where a text document and a photograph document exist whose differences between the first maximum frequency (MAX1) and the second maximum frequency (MAX2) are equal.

In such case, the ratio of the total frequencies (ALL) to (MAX1−MAX2) is the same between the text document and the photograph document, and they cannot be distinguished.

Therefore, in steps S45 and S46, whether the document is a text document or not is determined, and only the documents denied of the possibility of being a text document are subjected to step S47 where judgment is performed on whether they are photograph documents or not. Thus, according to the present process it is possible to correctly distinguish a text document from a photograph document, eliminating the possibility of erroneous distinction.

Further, since the decision of step S47 of FIG. 10 is not performed by using the tone width of the density histogram, it is possible to judge whether the document is a photograph document regardless of the tone width size.

Therefore, even if the photograph document has a biased tone (narrow tone width) such as in a blackish photograph or a whitish photograph, according to the above mentioned method it is possible to distinguish correctly whether or not the document is a photograph document.

Further, in extracting the second maximum frequency (MAX2) in step S44, the second maximum frequency concentration section is selected having the maximum frequency other than the density section from which the first maximum frequency (MAX1) is extracted and the density sections adjacent thereto, and this frequency is set as MAX2.

Thereby, the characteristics of the density histogram can be fully understood, and erroneous classification of the documents can be prevented.

When the document is a text/photograph document, the density histogram thereof does not satisfy the above-mentioned characteristics of a text document or the characteristics of a photograph document, as shown in FIG. 13.

Therefore, the input document which was judged neither as text document nor photograph document in steps S45, S46 and S47 can be judged as a text/photograph document.

The present invention has the following effects. The present invention provides a control unit constituting the printing system for ordering an image input device and an image output device to execute image processing, and the control unit sets up the share of items of image processing to be executed by the image input device and the image output device, respectively, according to the processing abilities of the image input device and image output device, so the image input device and the image output device each perform items of processing assigned thereto for the image data input through the image input device. Therefore, even if there is difference in the processing abilities between the image input device and the image output device, the present system enables to reduce the time required to perform image processing, and thus enables to complete the required image processing in a relatively short time.

According to the present printing system, the control unit sets up the items of image processing to be performed by the image output device depending on what type of image input device is being used, so the unit sets up the most appropriate items to be processed by the devices, thereby improving the quality of the output image. Further, by assigning more processes to be executed by the device having better processing ability of the image input and image output devices, the time required for printing is cut down, and the device having a lower processing ability is required to perform less image processing than the device having a higher processing ability.

According to the printing system of the present invention, the control unit sets up the items of image processing to be performed by the image output device based on the information included in the image data generated by the image input device, so the image input device can set up the most appropriate image processing items to be performed when generating the image data according to the classification of the document, and the quality of the output image is thus improved.

According further to the printing system of the present invention, the image output device is equipped with a control unit so that there is no need to provide a control unit that is separate from the image input and image output devices.

According to the printing system of the present invention, when the image input device transfers the image data to the image output device, the information on the already performed image processing items and the model data of the image input device is added to the image data being transferred, so that the image output device can confirm the image processing items that must be performed to the image data being transferred thereto.

According to the present printing system, when the image input device and/or image output device are not equipped with the necessary image processing function(s), they are designed to acquire the required function(s) from the control unit, so there is no need to prepare in advance the image processing functions to the image input device and the image output device.

According further to the present printing system, the system includes a step of setting up the share of required image processing items, and assigning the same to the image input device and the image output device, respectively, wherein the image processing items can be assigned most appropriately according to the processing abilities of the image input device and the image output device.

According to the printing method of the present invention, the control unit ordering the image input device and image output device to execute image processing includes setting up the items of image processing to be performed by the image output device depending on the type of image input device used, so the most appropriate image processing items are set up according to the type of image input device used, and the quality of the output image is improved. Moreover, the device having a better processing ability of the image input device and image output device is assigned to execute more processes, and the device having a lower processing ability is responsible for less processes, so that the time required for completing printing is reduced.

According to the printing method of the present invention, the control unit ordering the image input device and image output device to execute image processing includes the step of setting up the items of image processing to be performed by the image output device based on the information included in the image data that the image input device generates, so that the most appropriate image processing items can be set according to the document classification when the image input device generates the image data, and the quality of the output image is thereby improved.

According to the program of the present invention, the control unit recognizes the processing abilities of the image input device and image output device, the type of image input device used, sets up the image processing items to be performed by the image output device based on the information included in the input image data, and sets up the share of image processing items to be assigned to the image input device and image output device.

According to the recording medium of the present invention, a program can be stored in the recording medium and a control unit can read the printing method from the recording medium, so that the control unit can easily carry out the present printing method.

What is claimed is:

1. A printing system for providing a predetermined image processing including a plurality of image processing items to an image data generated by an image input device and for after said image processing, outputting said image data through an image output device; said system comprising:
   an image input device, said image input device having, or being capable of acquiring, image data processing abilities;
   an image output device, said image output device having, or being capable of acquiring, image data processing abilities, and
   a control unit, said control unit being in communication with said image input device and with said image output device, and
   (i) selectively and respectively ordering said image input device and said image output device to perform pre-allocated selected ones of said plurality of image processing items, according to processing abilities of said image input device and processing abilities of said image output device;
   (ii) causing said image input device to perform at least all items of image processing within its abilities and not within the processing abilities possessed or acquirable by said image output device,
   (iii) causing said image input device to add information indicative of those of said items of image processing allocated to said image input device actually performed thereby to image data as processed by said image input device,
   (iv) causing the image data as processed by said image input device and information indicative of those of said items of image processing allocated to said input device by said control device actually performed by said image input device to be transferred to said image output device, and
   (v) causing said image output device (a) to determine which of said predetermined items of image processing have not been completed by the image input device, (b) to determine what processing abilities not possessed by said image output device are necessary to complete all of the items of image processing that have not been completed by the image input device, (c) to acquire the processing abilities not possessed by the image output device necessary to allow the image output device to complete all of the items of image processing not completed by the image input device, (d) to complete all of the items of image processing not completed by the image input device, and (e) to output a fully processed image data.

2. A printing system according to claim 1, wherein said items of image processing include shading compensation, gamma correction, region isolation, black generation, filter/zoom processing, and halftone processing to be performed to said image data generated by said image input device.

3. A printing system according to claim 1, wherein
   said control unit includes a memory portion storing said processing abilities of said image input device and said image output device.

4. A printing system according to claim 1, wherein
   when said image input device and said image output device are not equipped to perform said items of image processing allocated thereto by said control unit, said control unit provides the capability to perform those respective functions to said image input device and/or to said image output device as necessary.

5. The printing system according to claim 1, wherein said control unit causes said image input device to create information packets, each said information packet comprising a header portion and a body portion, such that said image processing items allocated to said image input device actually performed thereby are contained in said header portion for reading first by said image output device upon a receipt of said packets, and said image data as actually processed by said image data input device is contained in said body of said information packets.

* * * * *